US 9,467,369 B2

(12) United States Patent
Panagos et al.

(10) Patent No.: US 9,467,369 B2
(45) Date of Patent: Oct. 11, 2016

(54) PACKETIZED CONTENT DELIVERY APPARATUS AND METHODS

(71) Applicant: Time Warner Cable Enterprises LLC, New York, NY (US)

(72) Inventors: James Panagos, Broomfield, CO (US); Jason Forbes, Broomfield, CO (US); Jeremy Spencer, Broomfield, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 13/958,467

(22) Filed: Aug. 2, 2013

(65) Prior Publication Data

US 2015/0040173 A1 Feb. 5, 2015

(51) Int. Cl.
*H04N 7/173* (2011.01)
*H04L 12/741* (2013.01)
*H04N 21/236* (2011.01)
*H04N 21/61* (2011.01)
*H04N 21/2225* (2011.01)
*H04N 21/231* (2011.01)
*H04N 21/24* (2011.01)

(52) U.S. Cl.
CPC .......... *H04L 45/74* (2013.01); *H04N 21/2225* (2013.01); *H04N 21/236* (2013.01); *H04N 21/23103* (2013.01); *H04N 21/2405* (2013.01); *H04N 21/6175* (2013.01)

(58) Field of Classification Search
CPC ..................... H04N 21/2402; H04N 21/2405; H04N 21/2183; H04N 21/23103; H04N 21/23116
See application file for complete search history.

(56) References Cited

U.S. PATENT DOCUMENTS

| | | | |
|---|---|---|---|
| 6,161,137 A * | 12/2000 | Ogdon et al. | 709/224 |
| 7,154,898 B1 * | 12/2006 | Pecus et al. | 370/401 |
| 7,602,820 B2 | 10/2009 | Helms et al. | |
| 7,954,131 B2 | 5/2011 | Cholas et al. | |
| 8,015,306 B2 | 9/2011 | Bowman | |
| 8,073,940 B1 * | 12/2011 | Richardson et al. | 709/223 |
| 8,301,776 B2 * | 10/2012 | Hebert et al. | 709/226 |
| 8,386,629 B2 * | 2/2013 | Tan et al. | 709/231 |
| 8,432,791 B1 | 4/2013 | Masters | |
| 8,713,623 B2 | 4/2014 | Brooks | |

(Continued)

OTHER PUBLICATIONS

Adams, et al., Protocol Independent Multicast—Dense Mode (PIM—DM): Protocol Specification (Revised), Jan. 2005.

(Continued)

*Primary Examiner* — Pankaj Kumar
*Assistant Examiner* — Timothy Newlin
(74) *Attorney, Agent, or Firm* — Gazdzinski & Associates, PC

(57) ABSTRACT

Apparatus and methods for delivery of content in a packetized network. In one embodiment, content and/or services can be associated with an IP address. The IP address may be assigned to multiple server devices disposed at geographically diverse locations. Delivery caches may advertise, via a routing protocol, one or more addresses to clients of the network. Route selection may be configured based on one or more rules such as geographical proximity, available bandwidth, server availability, server load, delivery cost, client subscription level, licensing rules, and/or other metric. Delivery caches may be configured to control their availability and/or load through IP address withdrawals and announcements. When the "closest" delivery cache may become unavailable (e.g., it is not announcing the IP address for the content the client is trying to obtain, a route to the next "closest" available delivery cache may be utilized.

27 Claims, 15 Drawing Sheets

(56) References Cited

U.S. PATENT DOCUMENTS

| | | | |
|---|---|---|---|
| 8,997,136 B2 | 3/2015 | Brooks et al. | |
| 2001/0049740 A1* | 12/2001 | Karpoff | H04L 12/5601 709/231 |
| 2002/0116529 A1* | 8/2002 | Hayden | 709/245 |
| 2003/0110509 A1* | 6/2003 | Levinson | H04J 14/0227 725/121 |
| 2003/0211839 A1* | 11/2003 | Baum et al. | 455/403 |
| 2004/0010588 A1* | 1/2004 | Slater et al. | 709/224 |
| 2004/0017769 A1* | 1/2004 | Denecheau et al. | 370/218 |
| 2004/0039844 A1* | 2/2004 | Bonn | 709/245 |
| 2006/0130113 A1 | 6/2006 | Carlucci et al. | |
| 2006/0190589 A1 | 8/2006 | Parker et al. | |
| 2007/0101379 A1* | 5/2007 | Pereira | 725/90 |
| 2008/0235746 A1 | 9/2008 | Peters et al. | |
| 2009/0100459 A1* | 4/2009 | Riedl et al. | 725/35 |
| 2009/0138601 A1* | 5/2009 | Hebert et al. | 709/226 |
| 2009/0260046 A1* | 10/2009 | Yang | 725/109 |
| 2009/0313330 A1* | 12/2009 | Sakamoto | 709/204 |
| 2010/0128918 A1* | 5/2010 | MacWan | 382/100 |
| 2010/0251305 A1 | 9/2010 | Kimble et al. | |
| 2010/0332595 A1* | 12/2010 | Fullagar et al. | 709/203 |
| 2011/0103374 A1 | 5/2011 | Lajoie et al. | |
| 2011/0302600 A1* | 12/2011 | Kelsen et al. | 725/32 |
| 2012/0023535 A1* | 1/2012 | Brooks | 725/110 |
| 2012/0110202 A1* | 5/2012 | Niman | 709/231 |
| 2013/0018978 A1* | 1/2013 | Crowe et al. | 709/214 |
| 2013/0121339 A1* | 5/2013 | Dispensa et al. | 370/401 |
| 2013/0188645 A1* | 7/2013 | Mack-Crane | 370/392 |
| 2013/0262697 A1* | 10/2013 | Karasaridis et al. | 709/242 |
| 2013/0318195 A1* | 11/2013 | Kwapniewski et al. | 709/213 |
| 2014/0164760 A1 | 6/2014 | Hybertson | |
| 2015/0271541 A1 | 9/2015 | Gonder et al. | |

OTHER PUBLICATIONS

Bhattacharyy, An Overview of Source-Specific Multicast, Jul. 2003.

Cain, et al., Internet Group Management Protocol, Version 3, Oct. 2002.

Deering, et al., Internet Protocol, Version 6 Specification, Dec. 1998.

Fenner, et al., Internet Group Management Protocol (IGMP)/ Multicast Listener Discovery (MLD)-Based Multicast Forwarding (IGMP/MLD Proxying), IETF RFC 4605, Aug. 2006.

Handley, et al., Bidirectional Protocol Independent Multicast (BIDIR—PIM), Oct. 2007.

Holbrook, et al., Using Internet Group Management Protocol Version 3 (IGMPv3) and Multicast Listener Discovery Protocol Version 2 (MLDv2) for Source-Specific Multicast, Aug. 2006.

http://www.kadrupp/net/en/computer/nat_tutorial.

Internet Protocol DARPA Internet Program Protocol Specification, Information Sciences Institute University of Southern California, Sep. 1981.

Vida, et al., Multicast Listener Discovery Version 2 (MLDV2) for IPv6, Jun. 2004.

Wing, et al., IP Multicast Requirements for a Network Address Translator (NAT) and a Network Address Port Translator (NAPT), IETF RFC 5135, Feb. 2008.

\* cited by examiner

PACKETIZED CONTENT DELIVERY APPARATUS AND METHODS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of content and/or data delivery over a network. More particularly, the present disclosure is related, in one exemplary aspect, to apparatus and methods for packetized content delivery via a network.

2. Description of Related Technology

The provision of content to a plurality of subscribers in a content distribution network is well known in the prior art. In a typical configuration, the content is distributed to the subscribers devices over any number of different topologies including for example: (i) Hybrid Fiber Coaxial (HFC) network, which may include e.g., dense wave division multiplexed (DWDM) optical portions, coaxial cable portions, and other types of bearer media; (ii) satellite network (e.g., from an orbital entity to a user's STB via a satellite dish); (iii) optical fiber distribution networks such as e.g., "Fiber to the X" or FTTx (which may include for example FTTH, FTTC, FTTN, and FTTB variants thereof); (iv) Hybrid Fiber/copper or "HFCu" networks (e.g., a fiber-optic distribution network, with node or last-mile delivery being over installed POTS/PSTN phone wiring or CAT-5 cabling); (v) microwave/millimeter wave systems; etc.

Various types of content delivery services are utilized in providing content to subscribers. For example, certain content may be provided according to a broadcast schedule (aka "linear" content). Content may also be provided on-demand (such as via video on-demand or VOD, free video on-demand, near video on-demand, etc.). Content may also be provided to users from a recording device located at a user premises (such as via a DVR) or elsewhere (such as via a personal video recorder or network personal video recorder disposed at a network location) or via a "startover" paradigm, which also affords the user increased control over the playback of the content ("non-linear").

Various systems and methods may be utilized for delivering media content to subscribers. For example, so-called "Internet Protocol Television" or "IPTV" is a system through which services are delivered to subscribers using the architecture and networking methods of an Internet Protocol Suite over a packet-switched network infrastructure (such as e.g., the Internet and broadband Internet access networks), instead of being delivered through traditional radio frequency broadcast, satellite signal, or cable television (CATV) formats. These services may include, for example, Live TV, Video On-Demand (VOD), and Interactive TV (iTV). IPTV delivers services (including video, audio, text, graphics, data, and control signals) across an access agnostic, packet switched network that employs the IP protocol.

Some existing content delivery network (CDN) solutions (e.g., Velocix) utilize proprietary software and/or hardware. Furthermore, in order to support advanced functionality (e.g., multi-tenancy, and/or other), some existing CDN may employ a centralized control system. Use of centralized control may increase deployment costs, system complexity, and/or reduce response time when adding features, responding to failures, and/or performing maintenance.

Accordingly, less costly, more flexible and scalable content delivery implementation that may be deployed utilizing commercial off the shelf hardware and without relying proprietary software and/or hardware implementations would be of benefit.

SUMMARY

The present disclosure addresses the foregoing needs by disclosing, inter alia, anycast apparatus and methods for packetized content delivery.

In one aspect of the disclosure, a method of providing content in a packet-enabled network is disclosed. In one embodiment, the method includes: associating the content with an address within the network; assigning the address to two or more nodes of the network, individual ones of the two or more nodes configured to deliver the content to a client of the network; advertising two or more routes associated with two or more nodes, individual ones of the two or more routes being characterized by the address; and based on a selection of a given route of the two or more routes, causing delivery of the content to the client by a node of the two or more nodes, the node corresponding to the given route.

In another aspect of the disclosure, a content delivery network is disclosed. In one embodiment, the network includes: at least one delivery cache in operable communication with a client device, the delivery cache configured to effectuate provision of content to the client device; and at least one first tier cache in operable communication with the delivery cache, the first tier cache configured to effectuate provision of the content to the delivery cache. In one variant, the at least one delivery cache is accessible by the client using an Internet Protocol (IP) address; and the at least one first tier cache is accessible by the delivery cache.

In a further aspect, a non-transitory computer-readable apparatus configured to store one or more computer programs thereon is disclosed. In one embodiment, the one or more computer programs include a plurality of instructions configured to, when executed: based on a request to withdraw an active route from a pool of active routes of a network, determine a network address associated with the route; determine existence of another active route of the pool of active routes; and effectuate withdrawal of the active route from the pool of active routes based at least on the determination of the existence of the another active route. In one variant, the active route and another active route are configured to provide content associated with the network address to a client of the network; and the determination of existence of the another active route is based at least on the existence of the route as advertised from a different delivery cache.

In yet another aspect, an "anycast" network architecture is disclosed. In one variant, the network comprises a content delivery network, and includes a multi-tiered configuration with the capability of distributing content to network clients via a plurality of routes.

In a further aspect, a method of operating a network is disclosed. In one embodiment, the network includes delivery caches that are configured to control their availability and/or load through IP address withdrawals and announcements. When the "closest" delivery cache becomes unavailable (e.g., it is not announcing the IP address for the content the client is trying to obtain), a route to the next "closest" available delivery cache may be utilized.

In another aspect, a method of mitigating IP address "stranding" in a content distribution network is disclosed.

These and other aspects become apparent when considered in light of the disclosure provided herein.

Figure 1:
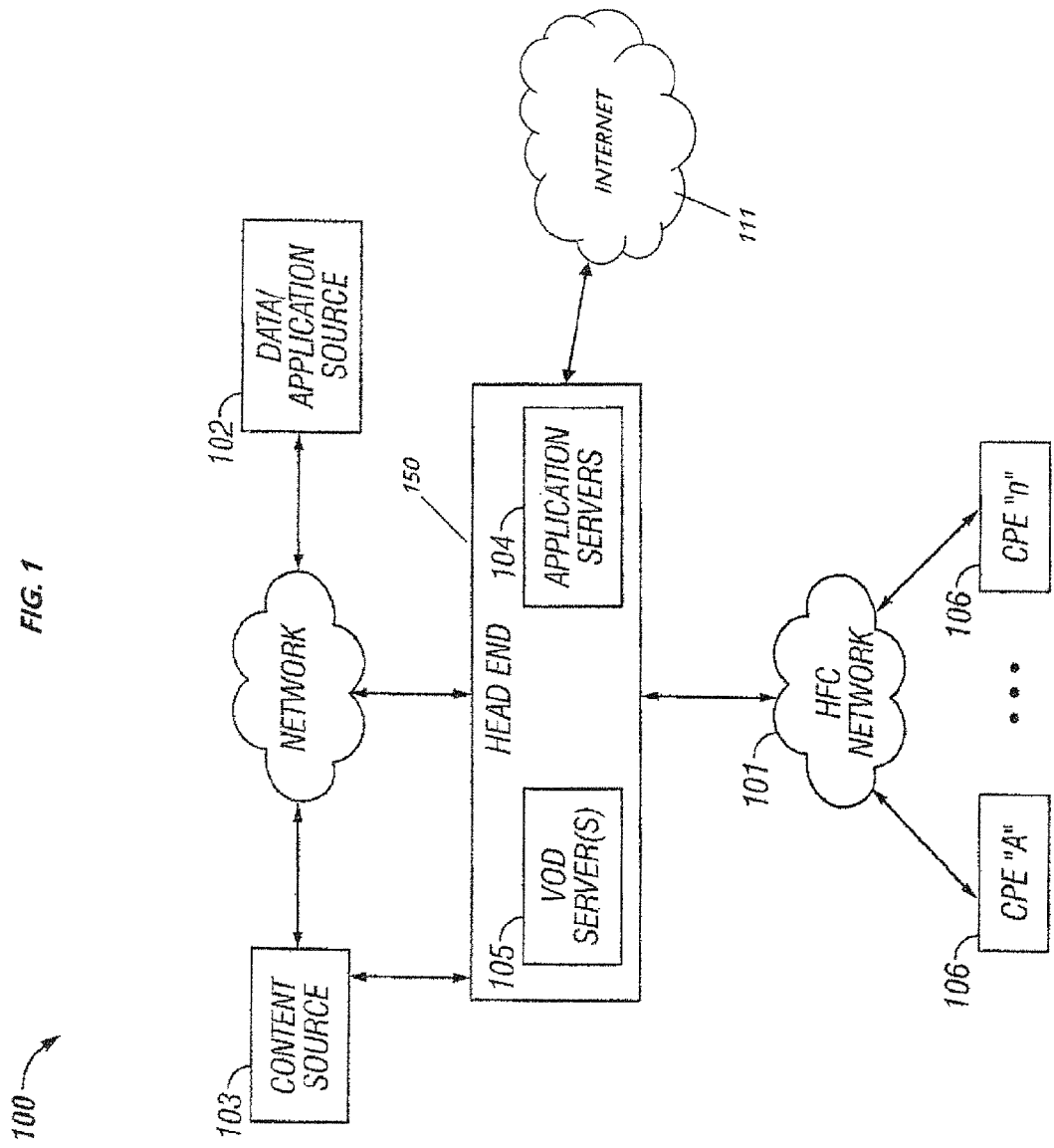
FIG. 1 is a functional block diagram illustrating an exemplary hybrid fiber network configuration useful with various aspects of the present disclosure.

All Figures© Copyright 2013 Time Warner Cable, Inc. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set top boxes (e.g., DSTBs), personal computers (PCs), and minicomputers, whether desktop, laptop, or otherwise, and mobile devices such as handheld computers, tablets, "phablets", PDAs, personal media devices (PMDs), and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The term "Customer Premises Equipment (CPE)" refers to any type of electronic equipment located within a customer's or user's premises and connected to a network, such as set-top boxes (e.g., DSTBs or IPTV devices), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, OLEDs, incandescent and fluorescent devices. Display devices may also include less dynamic devices such as, for example, printers, e-ink devices, and the like.

As used herein, the terms "Internet" and "internet" are used interchangeably to refer to inter-networks including, without limitation, the Internet.

As used herein, the term "memory" or "storage" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer without limitation to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), Wi-MAX (802.16), PAN (802.15), cellular (e.g., LTE/LTE-A, 3GPP, 3GPP2, UMTS), or IrDA families.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11a/b/g/n/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, NFC (e.g., ISO 14443A/B), narrowband/FDMA, OFDM, PCS/DCS, LTE/LTE-A/TD-LTE, analog cellular, Zigbee, CDPD, satellite systems, millimeter wave or microwave systems, acoustic, and infrared (i.e., IrDA).

Overview

In one salient aspect, the present disclosure provides apparatus and methods for content delivery in a packetized network. In one exemplary incarnation, a content and/or a service is associated with an IP address. The IP address may be assigned to multiple server devices that may be disposed at geographically diverse locations. Delivery caches may advertise, via e.g., a routing protocol, one or more addresses to clients of the network and/or other network entities. Route selection can be configured based on one or more rules, such as for example those relating to geographical proximity, available bandwidth, server availability, server load, delivery cost, client subscription level, content encoding rate (e.g., MPEG2, MPEG4, and/or other), client device type (e.g., a smartphone, a television), client connection bandwidth (e.g., LTE, Wi-Fi), client subscription level, and/or other rules licensing rules, and/or other metric.

Delivery caches are in an exemplary embodiment configured to control their availability and/or load through IP address withdrawals and announcements. When the "closest" delivery cache becomes unavailable (e.g., it is not announcing the IP address for the content the client is trying to obtain), a route to the next "closest" available delivery cache may be utilized. In some implementations, a combination of route-monitoring and a fallback delivery cache is employed to reduce and/or prevent IP address "stranding".

Delivery nodes may provide multiple service functions by advertising routes out of an assigned address pool assigned to individual service functions. By statically setting two or more advertised addresses for an individual delivery cache, delivery address availability address may be ensured when a given cache may fail, and/or withdraw its addresses from the advertised pool. However, this may be depreciated given the route-monitoring method discussed above.

In some implementations, hierarchical caching is supported. Content availability may be advertised via a mechanism such as e.g., border gateway protocol (BGP) announcements of pools of addresses. Access to different levels of cache hierarchy can be effectuated through the use of different pools of addresses. Proxy-enabled web servers enable selection of a backfill source based on the path being requested. In one variant, a hierarchical cache is configured to serve as a client facing delivery cache by advertising a route from an appropriate address pool. Hierarchical caches could also service client requests by advertising some subset of service function pool addresses.

Detailed Description of Exemplary Embodiments

Exemplary embodiments of the apparatus and methods of the present disclosure are now described in detail. While these exemplary embodiments are described in the context of a managed hybrid fiber coax (HFC) cable system architecture having a multiple systems operator, digital networking capability, and plurality of client devices/CPE, the general principles and advantages of the disclosure may be extended to other types of networks and architectures, whether broadband, narrowband, wired or wireless, terrestrial or satellite, managed or unmanaged (or combinations thereof), or otherwise, the following therefore being merely exemplary in nature.

It will also be appreciated that while described generally in the context of institutional service provision (e.g. academic, commercial, government, non-profit, etc.), the present disclosure may be readily adapted to other types of environments (e.g., home networks, etc.) as well. Myriad other applications are possible.

Further, although described in the context of service provision over an externally managed network, the architectures and techniques described herein may be readily applied to internal network management. The external managed network embodiments presented are merely used to demonstrate the flexibility and general applicability of the principles described herein (e.g. may be implemented with or without full administrator control of a network), and should not be considered in any way limiting.

In addition, while the disclosure refers at numerous points to one or more internet protocol television (IPTV) embodiments, the principles of the disclosure are contemplated in other applications, such as video services (e.g., network DVR, second screen apps, cloud based digital navigators, OnDemand or over-the-top (OTT) content (e.g., Netflix®, Hulu®, virtual MSO services, and/or other)), visual communications (i.e., Skype®, Facetime®, and/or other), or cloud computing/storage/streaming services. All such embodiments are considered disclosed herein.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

Bearer Network

FIG. 1 illustrates a typical content delivery network configuration. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC)

network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the present disclosure. For example, the headend architecture of FIG. 1a (described in greater detail below), or others, may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

The VOD server 105 and application distribution servers 104 are a part of the headend architecture of the network 100. The headend 150 can be connected to an internetwork (e.g., the Internet) 111.

Figure 1A:
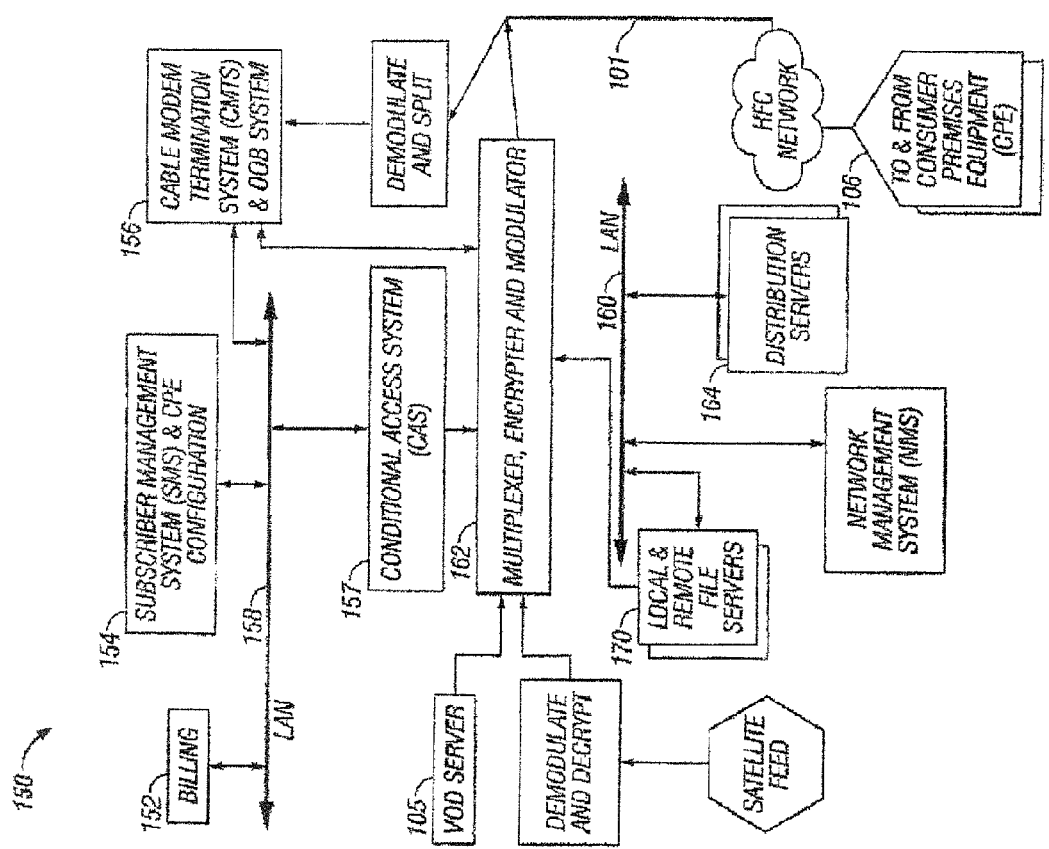
FIG. 1a is a functional block diagram illustrating one exemplary network headend configuration.

Referring now to FIG. 1a, one exemplary embodiment of a headend architecture is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Figure 1B:
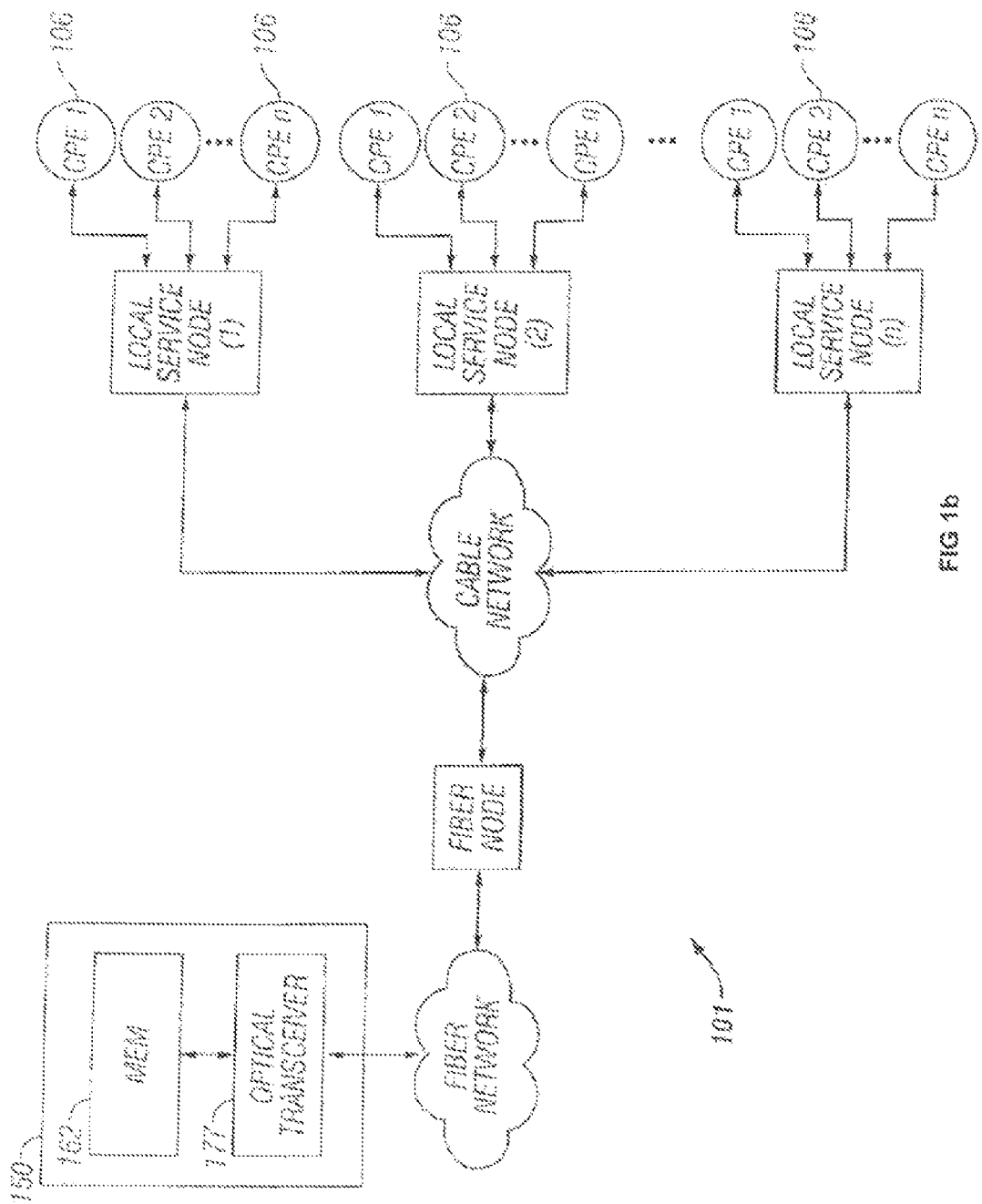
FIG. 1b is a functional block diagram illustrating one exemplary local service node configuration useful with various aspects of the present disclosure.

The exemplary architecture 150 of FIG. 1a further includes a conditional access system (CAS) 157 and a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Figure 1C:
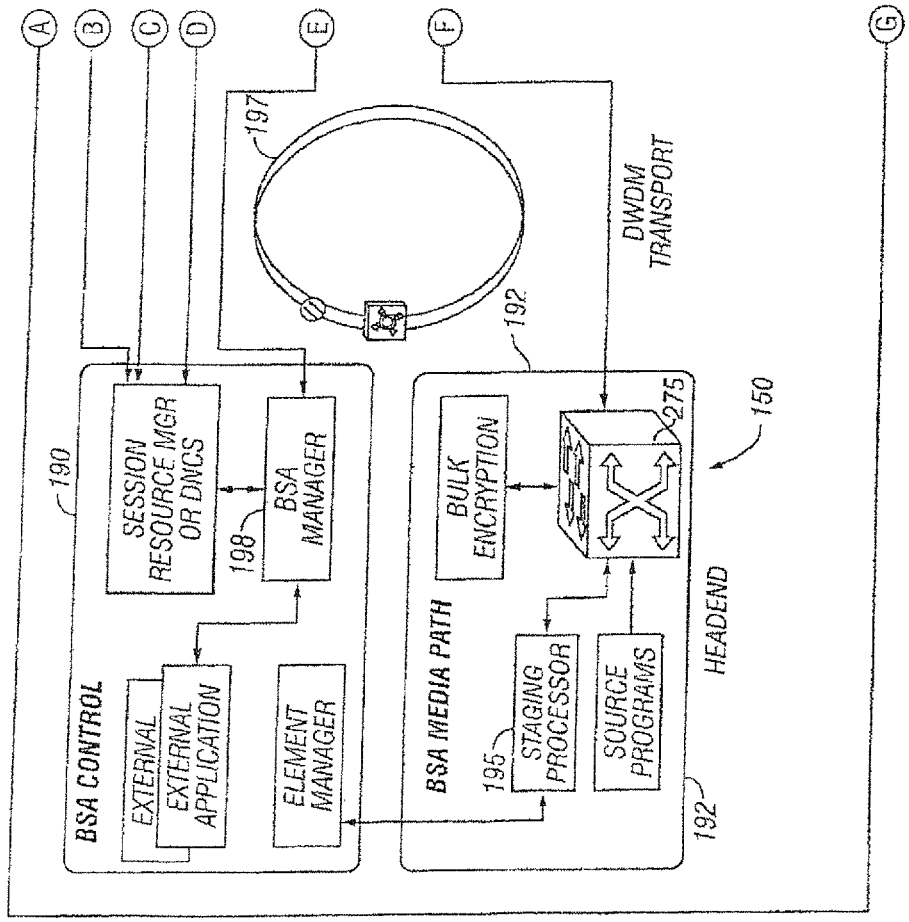
FIG. 1c is a functional block diagram illustrating one exemplary broadcast switched architecture (BSA) network.
Figure 1C:
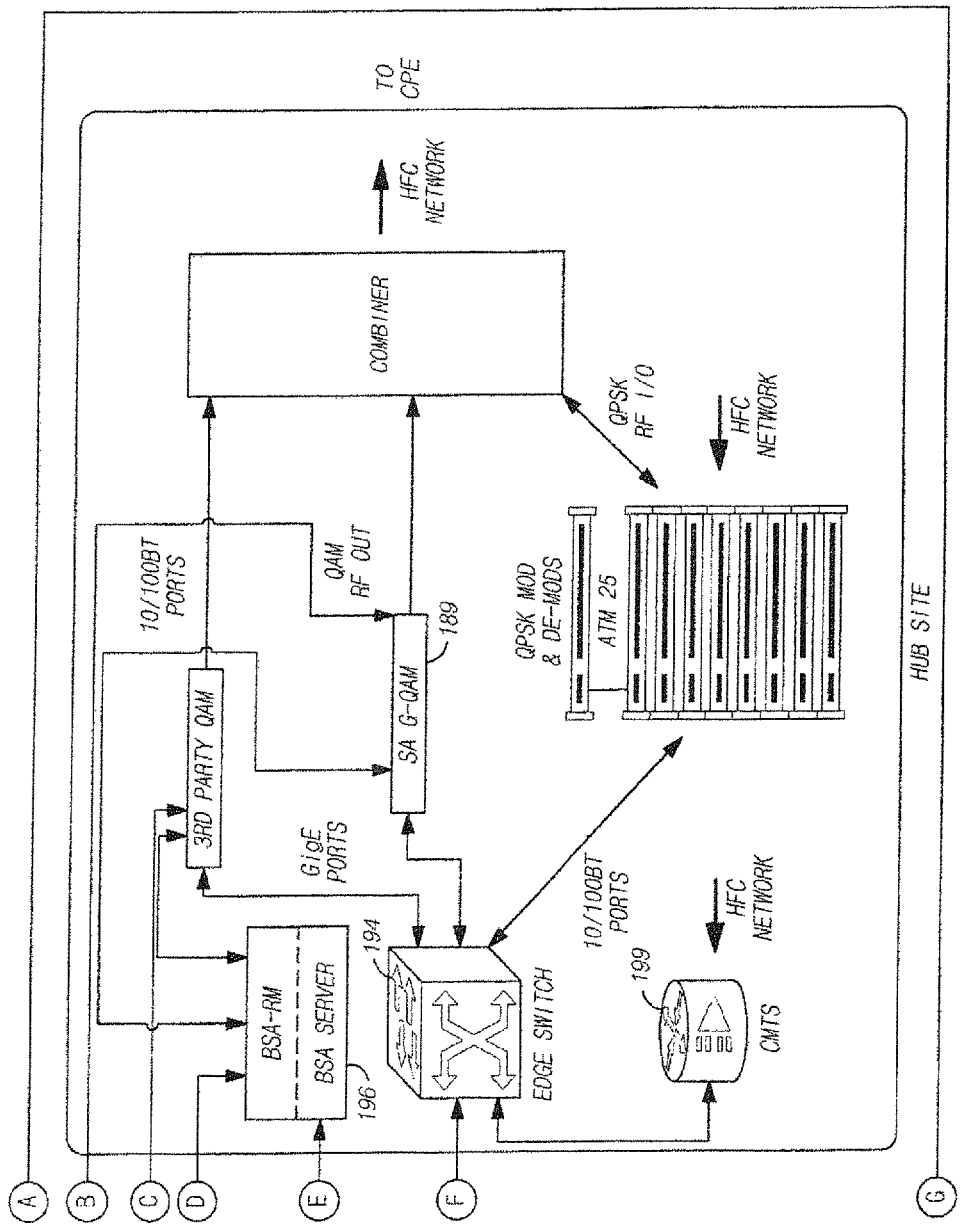

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the present disclosure is in no way limited to these approaches.

"Switched" Networks

FIG. 1c illustrates an exemplary "switched" network architecture. While a so-called "broadcast switched architecture" or BSA network is illustrated in this exemplary network architecture embodiment, it will be recognized that the present disclosure is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control 190 and media path functions 192; these element cooperating to control and feed, respectively, downstream or edge switching devices 194 at the hub site which are used to selectively switch broadcast streams to various service groups. BSA media path 192 may include a staging processor 195, source programs, and bulk encryption in communication with a switch 275. A BSA server 196 is also disposed at the hub site and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. Patent Application Publication No. 2003/0056217 filed Sep. 20, 2001, entitled "TECHNIQUE FOR EFFECTIVELY PROVIDING PROGRAM MATERIAL IN A CABLE TELEVISION SYSTEM", and issued as U.S. Pat. No. 8,713,623 on Apr. 29, 2014, incorporated herein by reference in its entirety, describes one exemplary broadcast switched digital architecture, although it will be recognized by those of ordinary skill that other approaches and architectures may be substituted.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

Referring again to FIG. 1c, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels (e.g., DOCSIS QAMs) that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized Networks"

Figure 1D:
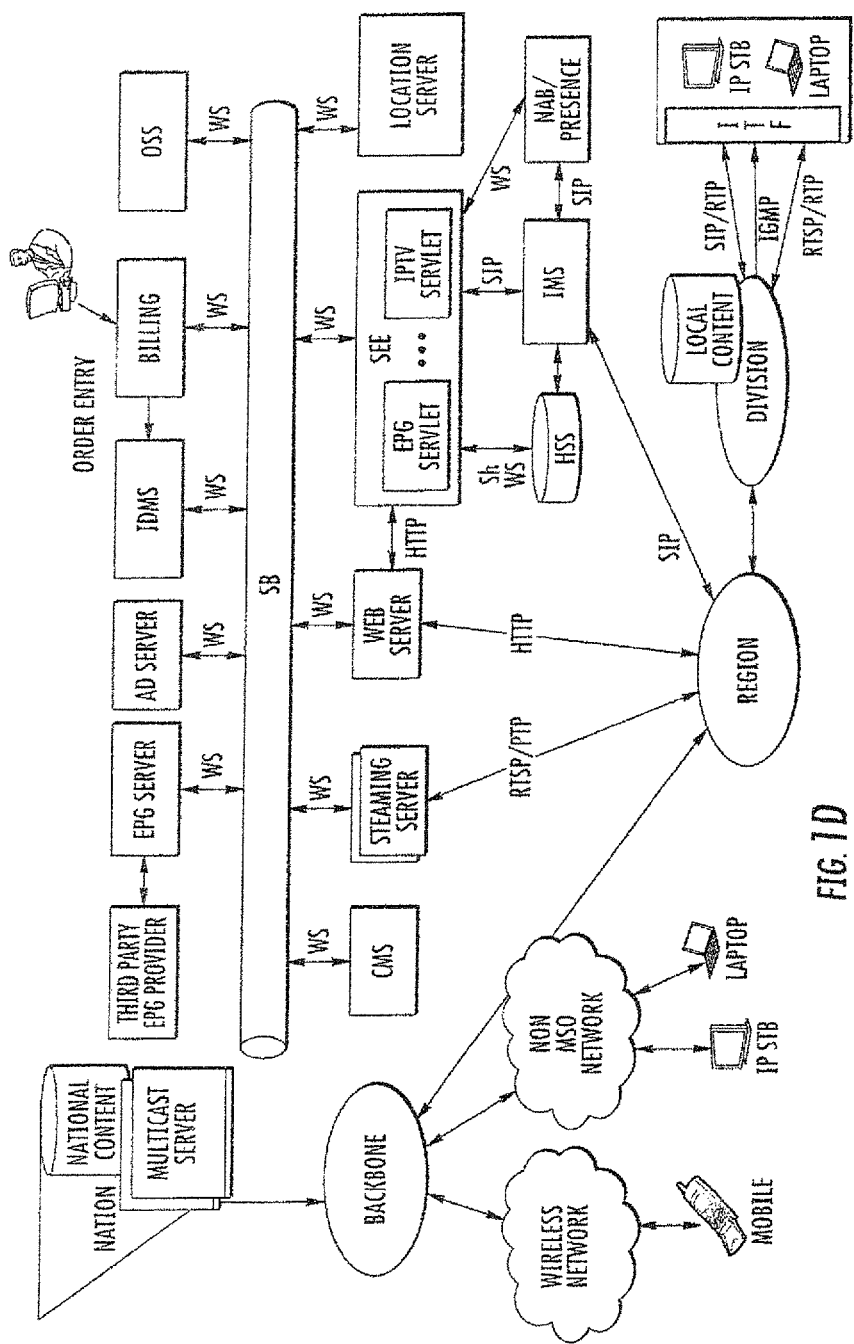
FIG. 1d is a functional block diagram illustrating one exemplary packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in co-pending U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

Figure 1E:
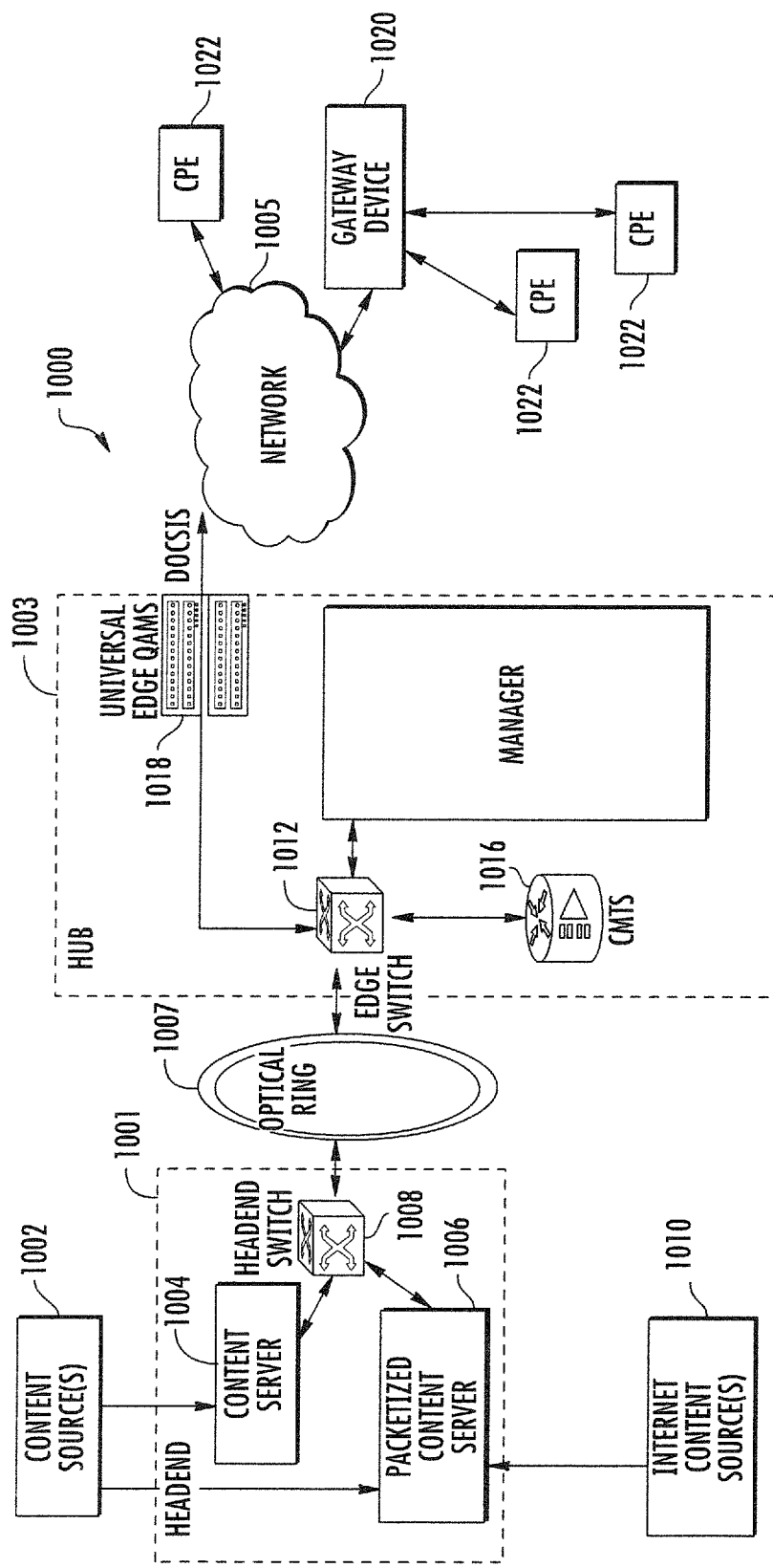
FIG. 1e is a functional block diagram illustrating a second exemplary packetized content delivery network architecture useful with various aspects of the present disclosure.

Referring now to FIG. 1e, another exemplary network architecture for the delivery of packetized content disclosure useful with the present disclosure. In addition to on-demand and broadcast content (e.g., video programming), the system of FIG. 1e may deliver Internet data services using the Internet protocol (IP), although other protocols and transport mechanisms of the type well known in the digital communication art may be substituted.

The network 1000 generally comprises a local headend 1001 in communication with at least one hub 1003 via an optical ring 1007. The distribution hub 1003 is able to provide content to various user devices, CPE 1022, and gateway devices 1020, via a network 1005.

Various content sources 1002 are used to provide content to a content server 1004. For example, content may be received from a local, regional, or network content library as discussed in co-owned U.S. application Ser. No. 12/841,906 filed on Jul. 22, 2010, entitled "APPARATUS AND METHODS FOR PACKETIZED CONTENT DELIVERY OVER A BANDWIDTH-EFFICIENT NETWORK", and issued as U.S. Pat. No. 8,997,136 on Mar. 31, 2015, which is incorporated herein by reference in its entirety. Alternatively, content may be received from linear analog or digital feeds, as well as third party content sources. Internet content sources 1010 (such as e.g., a web server) provide interne content to a packetized content server 1006. Other IP content may also be received at the packetized content server 1006, such as voice over IP (VoIP) and/or IPTV content. Content may also be received from subscriber and non-subscriber devices (e.g., a PC or smartphone-originated user made video). In one embodiment, the functionality of both the content server 1004 and packetized content server 1006 may be integrated into a single server entity.

A central media server located in the headend 1001 may be used as an installed backup to the hub media servers as (i) the primary source for lower demand services, and (ii) as the source of the real time, centrally encoded programs with PVR (personal video recorder) capabilities. By distributing the servers to the hub stations 1003 as shown in FIG. 1e, the size of the fiber transport network associated with delivering VOD services from the central headend media server is advantageously reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach can be utilized consistent with the disclosure. For example, one server configuration or architecture may be used for servicing cable, satellite, HFCu, etc. subscriber CPE-based session requests, while a different configuration or architecture may be used for servicing mobile client requests. Similarly, the content servers 1004, 1006 can either be single-purpose/dedicated (e.g., where a given server is dedicated only to servicing certain types of requests), or alternatively multi-purpose (e.g., where a given server is capable of servicing requests from different sources).

The network 1000 of FIG. 1e may further include a legacy multiplexer/encrypter/modulator (MEM; not shown) coupled to the network 1005 adapted to "condition" content for transmission over the network. In the present context, the content server 1004 and packetized content server 1006 may be coupled to the aforementioned LAN, thereby providing access to the MEM and network 1005 via one or more file servers (not shown). The content server 1004 and packetized content server 1006 are coupled via the LAN to a headend switching device 1008 such as an 802.3z Gigabit Ethernet (or incipient "10G") device. Video and audio content is multiplexed at the headend 1001 and transmitted to the edge switch device 1012 (which may also comprise an 802.3z Gigabit Ethernet device).

In one exemplary delivery paradigm MPEG-based video content may be delivered, with the video transported to user PCs (or IP-based CPE) over the relevant transport (e.g., DOCSIS channels) comprising MPEG (or other video codec such as H.264 or AVC) over IP over MPEG. That is, the higher layer MPEG- or other encoded content may be encapsulated using an IP protocol, which then utilizes an MPEG packetization of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs.

Individual CPEs 1022 of the implementation of FIG. 1e may be configured to monitor the particular assigned RF channel (such as via a port or socket ID/address, or other such mechanism) for IP packets intended for the subscriber premises/address that they serve.

In the switched digital variant, the IP packets associated with Internet services are received by edge switch, and forwarded to the cable modem termination system (CMTS) 1016. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the CPE. The IP packets are typically transmitted on RE channels that are different than the RF channels used for the broadcast video and audio programming, although this is not a requirement. As noted above, the CPE are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 1018. According to this embodiment, all of the content is delivered on DOCSIS channels, which are received by a premises gateway 1020 (described subsequently herein) and distributed to one or more CPE 1022 in communication therewith. Alternatively, the CPE 1022 may be configured to receive IP content directly without need of the gateway or other intermediary. As a complementary or back-up mechanism, audio/video content may also be provided in downstream (in-band) channels as discussed above; i.e., via traditional "video" in-hand QAMs. In this fashion, a co-enabled digital set top box (DSTB) or other CPE could readily tune to the new (in-band) RF video QAM in the event that their IP session over the DOCSIS QAM is for some reason interrupted. This may even be accomplished via appropriate logic within the CPE (e.g., autonomously, or based on signaling received from the headend or other upstream entity, or even at direction of a user in the premises; e.g., by selecting an appropriate DSTB or other CPE function).

In the embodiment illustrated in FIG. 1e, IP packetized content is provided to various user devices via the network 1005. For example, content may be delivered to a gateway apparatus 1020 which distributes content received thereat to one or more CPE 1022 in communication with the apparatus 1020.

In another variant, elements in both the headend and CPE 1022 are specially adapted to utilize transmission infrastructure to transmit and receive both multiplexed wideband content and legacy content as is described in co-owned U.S. patent application Ser. No. 11/013,671 filed on Dec. 15, 2004 and entitled "METHODS AND APPARATUS FOR WIDEBAND DISTRIBUTION OF CONTENT", and issued as U.S. Pat. No. 8,015,306 on Sep. 6, 2013, which is incorporated by referenced herein in its entirety. As discussed therein, the CPE 1022 or gateway 1020 of this embodiment may be configured to contain multiple tuners (or a single wide-band tuner) which allow the device to receive the signals from all of the relevant physical carriers simultaneously. The carriers are demodulated, and channel-based decryption and basic demultiplexing (recombination) is performed. If multiplexed, the streams are then delivered to a transport demultiplexer which demultiplexes all of the streams resident within the statistical multiplex.

Methods and apparatus for the switched delivery of content may also be utilized consistent with the present disclosure. For example, only that content for which there is at least one request from a user device may be provided. In one embodiment, the methods and apparatus disclosed in co-owned U.S. patent application Ser. No. 09/956,688 entitled "TECHNIQUE FOR EFFECTIVELY PROVIDING PROGRAM MATERIAL IN A CABLE TELEVISION SYSTEM", filed on Sept. 20, 2001, and issued as U.S. Pat. No. 8,713,623 on Apr. 29, 2014, which is incorporated herein by reference in its entirety, may be utilized for providing "switched" delivery of the IP content. For example, a mechanism may be employed whereby the delivery of a session is based at least in part on logic to determine whether any users for the session are active; e.g., a multicast with no remaining "viewers" (or session participants) may be collapsed, and the bandwidth reclaimed.

In another variant, IP simulcast content and existing on-demand, voice, and broadcast content are all provided to the headend switch device 1008 of FIG. 1e. The headend switch 1008 then provides the content to the optical ring 1007 for provision to one or more distribution hubs 1003. IP simulcast content is in one exemplary implementation retrieved from a plurality of content sources at an IPTV server.

The IP-packet content is transmitted to subscriber devices via the universal edge QAM 1018 and the edge network 1005. The IP video ("simulcast") content is presented to client devices capable of receiving content over the DOCSIS QAMs. For example, the aforementioned gateway device 1020 (as well as an advanced CPE 1022 such as an IP-enabled DSTB may receive the IP simulcast. Legacy CPE may receive content via the gateway device 1020, or via an audio/video "back-up" MPEG transport stream as previously described.

It is further appreciated that content may be delivered to various Worldwide Interoperability for Microwave Access (WiMAX)-enabled mobile devices (e.g., PMD or non-legacy CPE) via a WiMAX distribution hub of the type now ubiquitous in the wireless arts. WiMAX is a wireless technology that provides high-throughput broadband connections over longer distances (as compared to short-range technologies such as WLAN, Bluetooth or PAN). WiMAX can be used for a number of applications, including "last mile" broadband connections, cellular backhaul, hotspot coverage, and high-speed enterprise connectivity, as well as broadband delivery to mobile devices.

Moreover, the aforementioned WiMAX technology may be used in conjunction with a WiMAX-enabled gateway (not shown) or CPE, such that content is delivered wirelessly to the gateway or CPE from the distribution hub, irrespective of the indigenous wired or optical distribution network infrastructure.

In the illustrated embodiment, the gateway device 1020 serves as a gateway to the IP content for other client devices (such as other CPE 1022 and PMD). The gateway device 1020 may communicate with one or more connected CPE 1022, as well as utilize Wi-Fi capabilities (where so equipped) to communicate wirelessly to other devices. It will also be recognized that the present disclosure may be configured with one or more short-range wireless links such as Bluetooth for lower bandwidth applications (or UWB/PAN for greater bandwidth applications).

In another embodiment, content received at a first user CPE 1022 may be transmitted to CPE 1022 of other premises in a peer-to-peer (P2P) fashion. For example, first content may be requested and received at a first CPE 1022. Then, when a second CPE 1022 in the same region or division requests the same content, the request may be examined by a headend entity (not shown), or the gateway 1020 acting as a peer proxy, to determine that the requesting second device CPE 1022 is entitled to receive the content and that the content is available at the first CPE 1022. The headend entity directs a peer-to-peer communication to be established between the authorized second CPE 1022 and the CPE 1022 having the requested content. It is appreciated that while described herein in the context of a single CPE 1022 providing content to a second CPE 1022, several CPE 1022 having the content thereon may be contacted for simultaneous delivery of the content to one or more second CPE 1022. In one such implementation, the peer-to-peer communication methods and apparatus disclosed in co-owned U.S. patent application Ser. No. 11/726,095 entitled "METHOD AND APPARATUS FOR CONTENT DELIVERY AND REPLACEMENT IN A NETWORK" filed Mar. 20, 2007, which is incorporated herein by reference in its entirety, may be utilized in conjunction with the present disclosure. As discussed therein, these P2P methods and apparatus also advantageously improve the "robustness" or capability of the network with respect to ensuring that subscribers or other users can receive and access desired content when they want, as well as seamlessly repairing or reconstituting damaged or missed portions of that content (including even an entire streamed program, broadcast or download).

It is still further appreciated that the delivery of content may include delivery from an "off-net" distribution hub (not shown) to another network (not shown), not associated with the MSO. In this embodiment, a requesting device (such as CPE 1022 or gateway 1020) may request content from a local headend 1001 which is transferred over both MSO-maintained ("on-net") and "off-net" networks advantageously.

"Anycast" Content Delivery Networks

Figure 2:
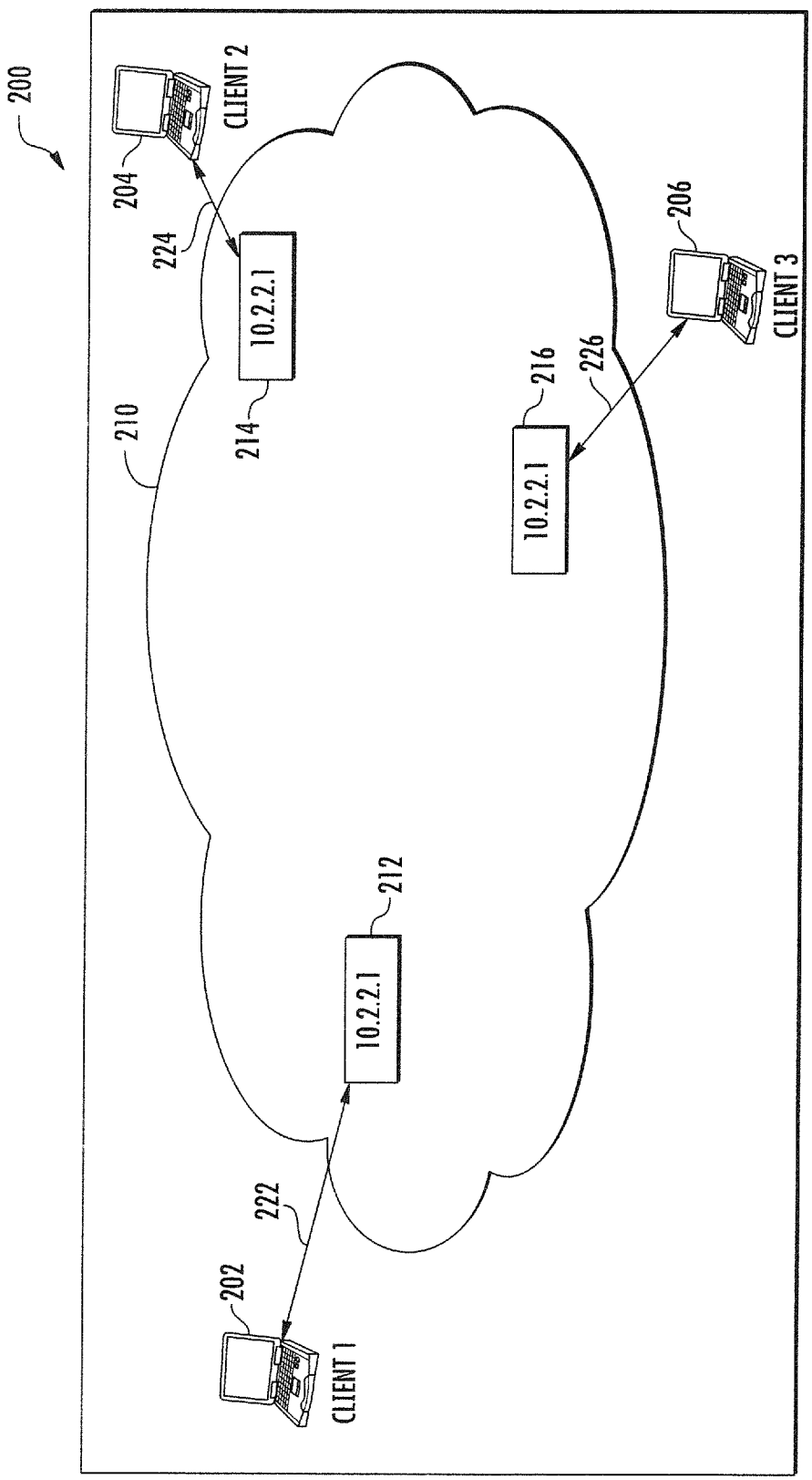
FIG. 2 is a functional block diagram depicting an exemplary "anycast" network architecture for delivery of packetized content in accordance with one or more implementations.

FIG. 2 illustrates an exemplary anycast network configuration for delivery of packetized content in accordance with one or more implementations of the present disclosure. It will be appreciated that the configuration 200 shown in FIG. 2 is a high-level logical representation which can be adapted for use with, inter alia, one or more of the foregoing network architectures described with respect to FIGS. 1a-1e herein, or yet other architectures.

The network configuration 200 includes a content delivery network 210 operably coupled to one or more clients 202, 204, 206. In some implementations, individual clients (e.g., 202) include for instance the CPE 1022 described above with respect to FIG. 1e. The CDN 210 may comprise multiple content delivery sources, e.g., servers 212, 214, 216. In some implementations, the anycast approach includes a source address (e.g., IP address of content servers 212, 214, 216) numbering methodology, wherein a given IP addresses, e.g., 10.2.2.1, may be associated with multiple content servers providing given content and/or service. Individual servers 212, 214, 216 with the same IP address are disposed in geographically diverse locations. The anycast approach further comprises, in various embodiments, the advertisement of delivery routes. The routes 222, 224, 226 are advertised in the routing tables. The tables are available at each serving location (e.g., servers 212, 214, 216) so as to enable the "shortest path" routing of requests from clients (e.g., 206) to the closest destination server (e.g., 216) via the shortest route 226 based on normal IP routing rules. Hence, the anycast methodology advantageously enables abstraction of the content availability advertisement from the actual serving of content. Such abstraction can, inter alia, alleviate a need for a centralized control system, such as those of the prior art.

FIG. 2 depicts three (3) distinct clients 202, 204, 206 that may attempt to reach a content server at address 10.2.2.1. By employing the anycast methodology of the present disclosure, individual clients 202, 204, 206 may be routed to three distinct servers 212, 214, 216, via routes 222, 224, 226. The routes 222, 224, 226 can be configured in accordance with one or more IP routing rules. In some implementations, the routing rule is based on proximity of a content server to the client (e.g., route the 226 for the client 206 and the server 216). The routing rule may also be configured based on server availability, server load, delivery cost, route available bandwidth, subscription level (e.g., basic or guaranteed delivered bandwidth) and/or other metrics or combinations thereof.

In the exemplary realization illustrated in FIG. 2, content delivery may be configured as follows. To receive content, a client device (e.g., 202) may submit a request to a CST (or content location mapping layer). The request may comprise a request for a particular content (e.g., watch a TV show) and/or a service (e.g., a video services (e.g., network DVR, second screen apps, cloud based digital navigators, OnDemand or over-the-top (OTT) content (e.g., Netflix®, Hulu®, virtual MSO services, etc.)), visual communications e.g., Skype®, Facetime®, etc), or cloud computing/storage/streaming and/or other services. The CST provides the client with a universal resource locator (URL) (e.g. timewarner.video.com) associated with the content and/or service being requested. The client may resolve the hostname in that URL to a destination IP address (e.g., 10.2.2.1) of one or of one or more servers that is to provide the requested content. In some implementations, the client may perform a DNS lookup to resolve the host name. The client may also or alternatively be provided with a list of servers based login and authentication into the network. In some implementations, based on a DNS request by the client, the DNS server may respond with a list of available IP addresses, e.g., 10.0.0.19, 10.0.0.20, 10.0.0.1, 10.0.0.2. The client may be configured to select one address using one or more selection methodologies such as e.g., random selection, and/or other mechanism. In some implementations, the DNS server may provide an IP address (e.g., 10.2.2.1) from a bank of available IP addresses using, e.g., round robin or other selection methodology. The various implementations described above can advantageously enable spreading of load associated with content delivery among a number (N) of IP addresses in the pool.

The client 206 can submit requests for content and/or service to the resolved address (10.2.2.1). Based on the anycast methodology described above, a server associated with the selected route (e.g., the route 226 to the closes server 216) serves the requested content. It will be appreciated by those skilled in the art that although DNS address resolution is described above, other IP distribution/resolution methodologies may be utilized, such as, e.g., provision of a server name list during client authentication with the network.

IP distribution/resolution methodologies may also utilize an arbitration layer, which receives the resolution request (be it DNS, or otherwise) and either locally select an edge server, or proxy the request to another selecting agent (Velocix DNS, for example).

Figure 3:
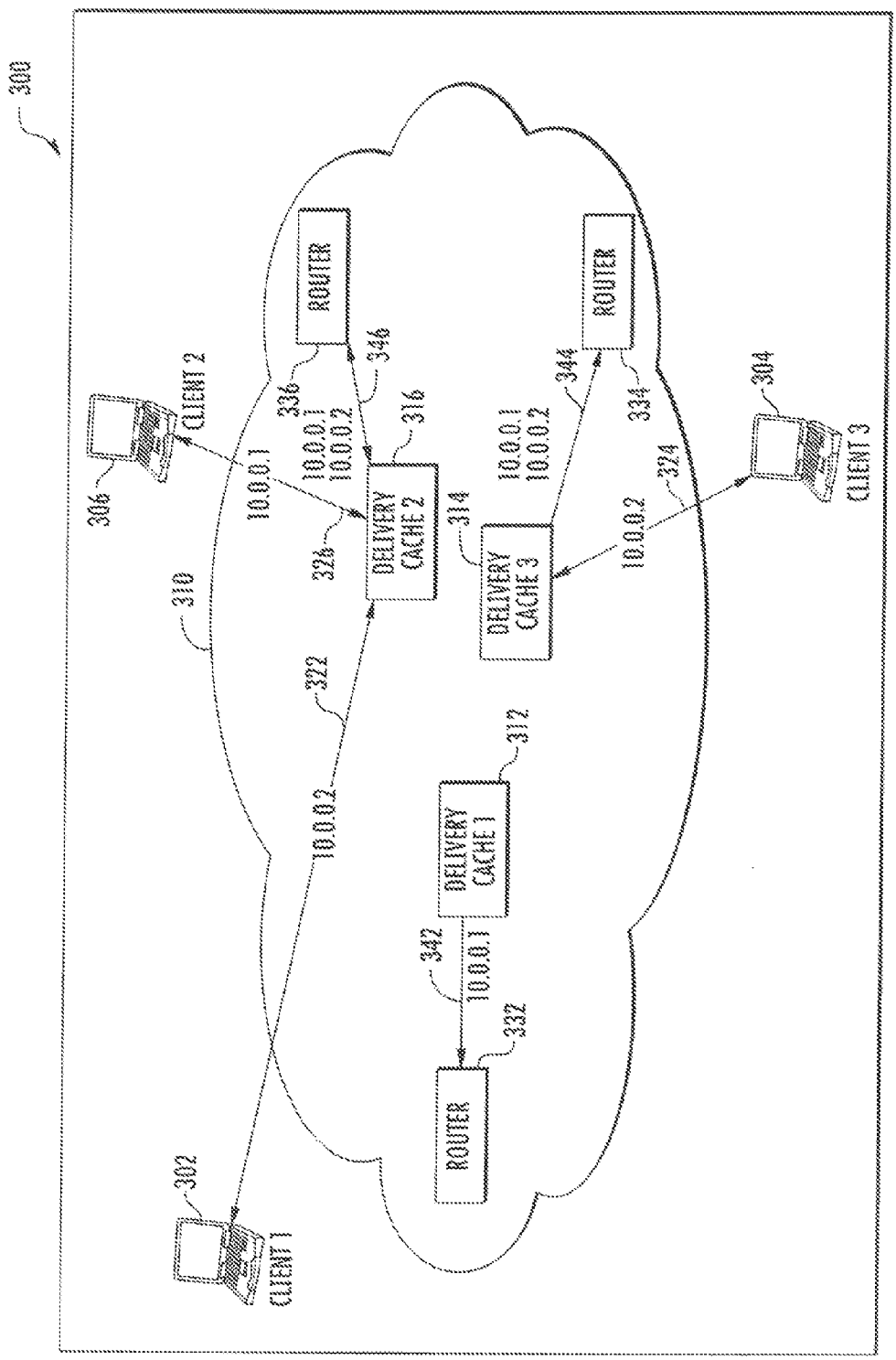
FIG. 3 is a functional block diagram illustrating an exemplary route advertisement and client flow in a content delivery network in accordance with one or more implementations

Various portions of the CDN may become unavailable due to failures, high demand, and/or maintenance. FIG. 3 illustrates an exemplary route advertisement and client flow configuration that implements redundancy for a content delivery network in accordance with one or more implementations. Content delivery redundancy may be effectuated by use of content delivery caches. The exemplary network configuration 300 includes a content delivery network 310 operably coupled to one or more clients 304, 306, 302. The CDN 310 also includes one or more content delivery caches 312, 314, 316. To account for equipment failure and/or allow for dynamic traffic adjustment, a routing protocol is implemented between the delivery cache (e.g., 312, 314, 316 in FIG. 3) and the respective upstream router (e.g., 332, 334, 336). In some implementations, the delivery cache(s) may advertise a number of the anycast routes (between 0 and N) that the clients may receive the content from. A failure of a given delivery cache and/or route can accordingly be detected, and "converged around".

The arrows denoted 342, 344, 346 in FIG. 3 correspond to border gateway protocol (BGP) route advertisements; arrows denoted 322, 324, 326 correspond to the content requests and fulfillment. Clients of the network system shown in FIG. 3 have already performed cache resolution step using e.g. DNS. In one embodiment, the cache resolution provides clients 302, 304, 306 with two IP addresses 10.0.0.1 and 10.0.0.2 associated with the caches 312, 314, 316. The cache 312 is in the exemplar of FIG. 3 configured to serve content via the IP address 10.0.0.1; the caches 314, 316 are configured to serve content via the IP addresses 10.0.0.1 and 10.0.0.2. The client 302 and the client 304 may select the address 10.0.0.2 for content requests and fulfillment; the client 306 may select the address 10.0.0.1. Responsive to a detection of a failure, the delivery cache 312 removes its route from the advertised routes. In some implementations, the cache 312 route removal may be effectuated by discontinuing of IP address 10.0.0.1 advertisement.

The failure referenced above may be due to any number of reasons (or combinations thereof), such as e.g., excessive load, hardware failure, and/or maintenance.

It is noteworthy that the exemplary anycast approach described herein may enable the caches 314, 316 may continue advertising the route 10.0.0.1. The clients 306, 304 can select routes 326, 324, respectively, to the geographically closest cache. The client 302 selects the route 322 to the geographically closest of the available caches (e.g., the cache 316) via the address 10.0.0.2, as the geographically closest cache 312 to the client 302 is not available.

It is also appreciated that the cache selection/deactivation mechanism described herein may enable cache load manipulation (e.g., decrease or increase). In some implementations, other BGP route selection criteria may also be used for cache activation/deactivation, e.g., transmission cost, route available bandwidth, subscription level of a client, and/or other metrics.

The "anycast" CDN described herein may be configured to reduce (and even altogether prevent) load oscillation due to two occurrences of one or more non-responsive entities (e.g., caches) within the network. The address advertising block of the anycast CDN may be configured in accordance with e.g., a mechanism which achieves a desired performance goal, such as for example an exponential hold-down mechanism. The hold-down mechanism may in one variant increasingly delay the amount of time the broadcast entity (e.g., a delivery cache) may wait before advertising available IP addresses and/or withdrawing an available route.

In one or more implementations, the CDN includes a load balancing algorithm or apparatus configured to diagnose and/or mitigate cascading load-based problems and/or uncontrolled load oscillations that may occur.

Figure 4:
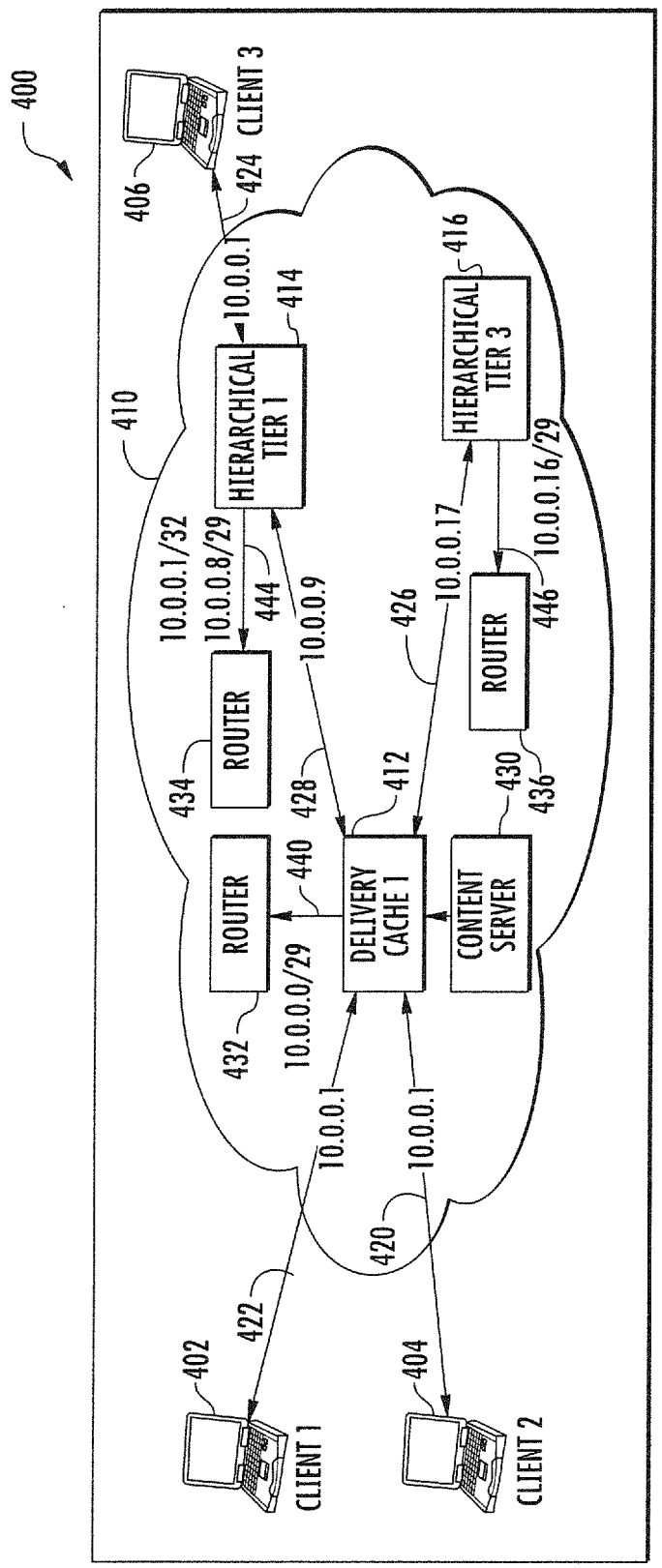
FIG. 4 is a functional block diagram depicting an exemplary hierarchical caching process in a content delivery network in accordance with one or more implementations.

In some instances of content availability advertisement via BGP announcements, hierarchical caching may be supported through the use of different pools of IP addresses advertised using the exemplary anycast methodology described herein. FIG. 4 depicts an exemplar of hierarchical caching in a content delivery network configured in accordance with one or more implementations of the present disclosure. The network configuration 400 of FIG. 4 includes a content delivery network 410 operably coupled to one or more clients 402, 404, 406 (e.g., the CPE 1022 of FIG. 1e). One or more caches (e.g., 412) function as a delivery cache. The delivery cache 412 is in one embodiment characterized by an access link to a content server (e.g., 430 in FIG. 4). One or more caches (e.g., 414) include tier 1 hierarchical cache. The tier 1 hierarchical cache 414 is coupled to the delivery cache 412. The tier 1 hierarchical cache 414 can be characterized by a route to a client 406 comprising a single hop (e.g., the route 424 of FIG. 4). One or more caches (e.g., 414) are tier 1 hierarchical caches, and are coupled to the delivery cache 412.

In the network configuration 400 of FIG. 4, the client 402 can be configured to receive content from the cache 412 via a delivery route 422. Likewise, the client 404 receives content from the cache 412 via the delivery route 420. The delivery cache 412 can be configured to provide the content by advertising, e.g., IP address 10.0.0.1. The delivery cache 412 is further configured to use addresses 10.0.0.8-10.0.0.29 to communicate to one or more second tier caches (e.g., 414 in FIG. 4). In some realizations, the content requested by the client 402 may have been previously requested by one or more other entities of the network 400 (e.g., the client 406).

This content may be deemed as 'popular', and retained (stored) by the cache 414 for faster fulfillment of future requests. The use of second and/or third tier caches advantageously reduces content retrieval from a content server (e.g.,1004 in FIG. 1e). The use of caching reduces delays and/or traffic loads associated with serving content to network clients (e.g., 402, 404, 406) as well.

By way of a non-limiting example, the cache 412 utilizes a second tier cache 414 to retrieve (backfill) cached content for the route 422; the content being requested by the client 404 may be deemed less popular (e.g., compared to the content being requested by the client 402), and may be available from the third tier cache (416). The cache 412 utilizes the third tier cache 416 in order to fulfill content requests for the route 420. The cache 412 utilizes the address 10.0.0.16-10.0.0.29 in order to retrieve the content (that may be associated with the route 420) from the cache 416. The routing of a content request (by, e.g., the client 414) from the first tier cache 412 to the third tier cache 416 is referred to as cache tier "skipping". The cache hierarchy may comprise a number of layers that may be supported by the network hardware and/or software.

In some implementations, the second tier cache 414 may advertise the address 10.0.0.1, thereby enabling direct service of client requests. As shown in FIG. 4, the client 406 may utilized the cache 414 in order to receive content via the route 424. With respect to the client 406, the cache 414 is referred to as the "first tier cache". BGP announcements 440, 444, 446 may be communicated to respective routers 432, 434, 436 to accomplish the foregoing.

In the exemplary implementation, the first tier (delivery) cache (e.g., 412) is configured to service client requests by advertising an address from the range between 10.0.0.0 and 10.0.0.29. A second tier cache (e.g., 414) is configured to advertise an address from the range between 10.0.0.8 and 10.0.0.29. A third tier cache (e.g., 416) is configured to advertise an address from the range between 10.0.0.16 and 10.0.0.29.

Proxy-enabled servers can also be configured to select a backfill source based on the path being requested. This method also allows for a hierarchical cache to also serve as a client-facing cache by advertising one or more routes out of the 10.0.0.0-10.0.0.29 pool. Address based routing may allow skipping of cache tiers, backfilling to a tier more than 1 layer higher. In some implementations, the backfill is effectuated from the content origin (e.g., the content server 1004 in FIG. 1e). By way of an illustration, requests from the client 402 requesting content associated with, e.g., the address 10.0.0.10 may be routed to the second tier cache 414. Requests from the client 402 requesting content associated with, e.g., the address 10.0.0.20 may be routed to the third tier cache 416. Clients would be given addresses out of the range according to 10.0.0.0/27, while client facing delivery caches would be configured to backfill from the range according to 10.0.0.8/29.

As a brief aside, so-called "bit mask" or "slash" notation is commonly used within the networking arts to represent a range of addresses between a highest address and a lowest address. Bit mask notation consists of the lowest address which is appended with the number of most significant bits to be "masked off" (the most significant bits for the highest address which are the same as the most significant bits of the lowest address can be ignored). Another common notation is the so-called "IP subnet mask" notation which is a decimal (i.e., base 10) representation of each byte of an IP address that is to be masked e.g., an IP subnet mask of 255.255.255.224 masks the 27 most significant bits of an IP address. In the foregoing example, the range from 10.0.0.29 to 10.0.0.0 requires 5 bits to express (29# decimal is equivalent to 11101# binary). Thus, the range of addresses can be represented with the bit mask notation of 10.0.0.0/27 which indicates a lowest address of 10.0.0.0, and where the 27 most significant bits are the same between the highest and lowest address of the range (i.e., 32 bits of total address minus the 27 most significant bits results in the 5 bits necessary to represent the range).

Figure 5:
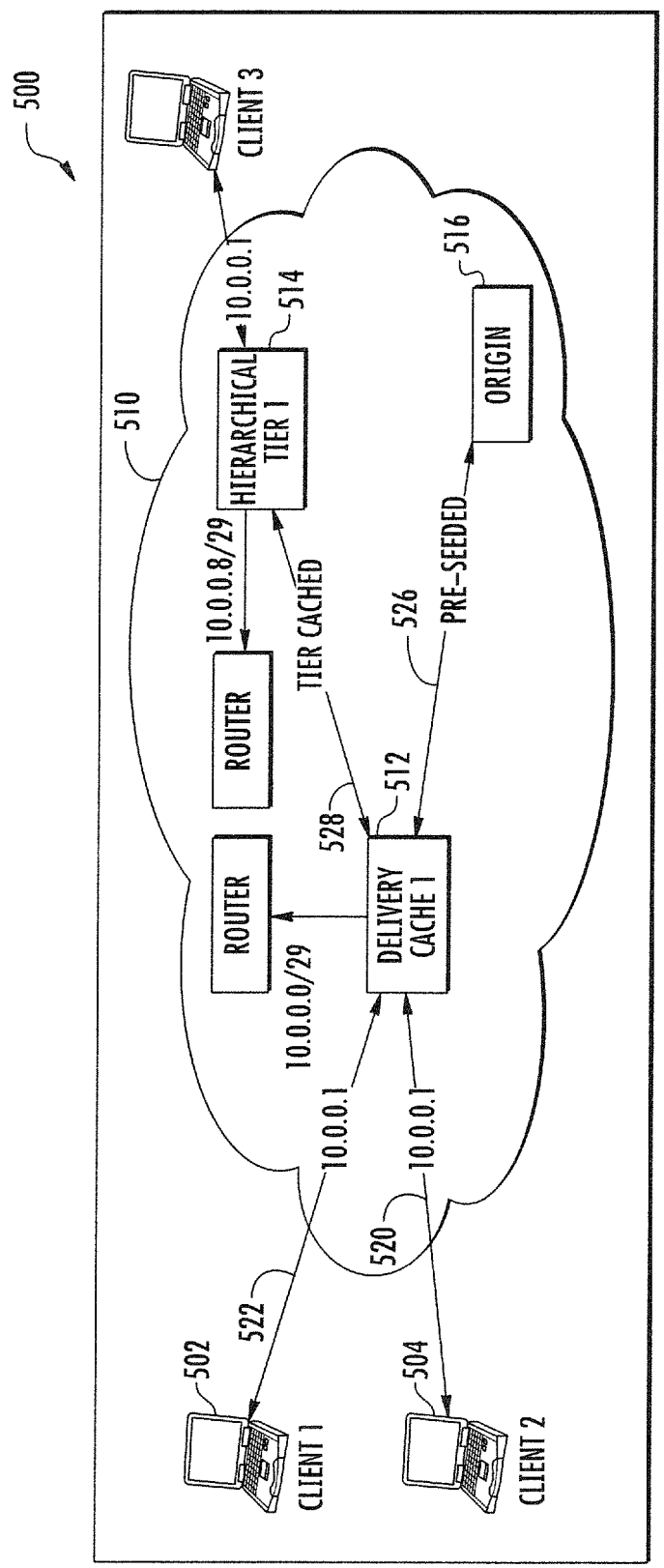
FIG. 5 is a functional block diagram depicting an exemplary VOD pre-seeding process in an anycast CDN in accordance with one or more implementations.

FIG. 5 depicts an exemplary VOD pre-seeding configuration 500 in an anycast CDN 510 in accordance with one or more implementations of the present disclosure. The network configuration 500 of FIG. 5 includes a content delivery network 510 operably coupled to one or more clients 502, 504 (e.g., the CPE 1022 of FIG. 1e). One or more caches (e.g., 512) function as a delivery cache. The delivery cache is in one embodiment characterized by an access link to a content origin (e.g., server 516 in FIG. 5). One or more caches (e.g., 514) include tier 1 hierarchical cache. The tier 1 hierarchical cache 514 is coupled to the delivery cache 512.

In the network configuration 500 of FIG. 5, the clients 502, 504 can be configured to receive content from the cache 512. The delivery cache 512 can be configured to provide the content by advertising, e.g., IP address 10.0.0.1. The clients 502, 504 may request the desired content using the exemplary anycast methodology, via e.g., the IP address 10.0.0.1.

A salient feature of the "anycast" approach described herein is that popular VOD content can be pre-seeded on client delivery caches, allowing the clients to pull content from these assets without the penalty of a first-request backfill. Pre-seeding, in conjunction with "VOD pool" address advertisement, may be configured to direct a client (e.g., the client 504 in FIG. 5) to the closest client delivery cache (e.g., 512) that may already contain the requested content. The content associated with the IP address 10.0.0.1 may be provided to the delivery cache 512 from the content origin 516 via the route 526. Accordingly, the pre-seeding content delivery may be accomplished via a single hop route (e.g., 520, 522 in FIG. 5). Responsive on the requested content being absent (e.g., not pre-seeding, the client delivery cache 512 may perform backfill steps. In some implementations, the backfill may comprise requesting the non-pre-seeded content (e.g., associated with the IP address 10.0.0.8/29) from the tier 1 cache 514. Non-pre-seeded content delivery may be accomplished via a route comprising two or more hops (e.g., 520 and 528 or 522 and 528 in FIG. 5).

Methods

Figure 6:
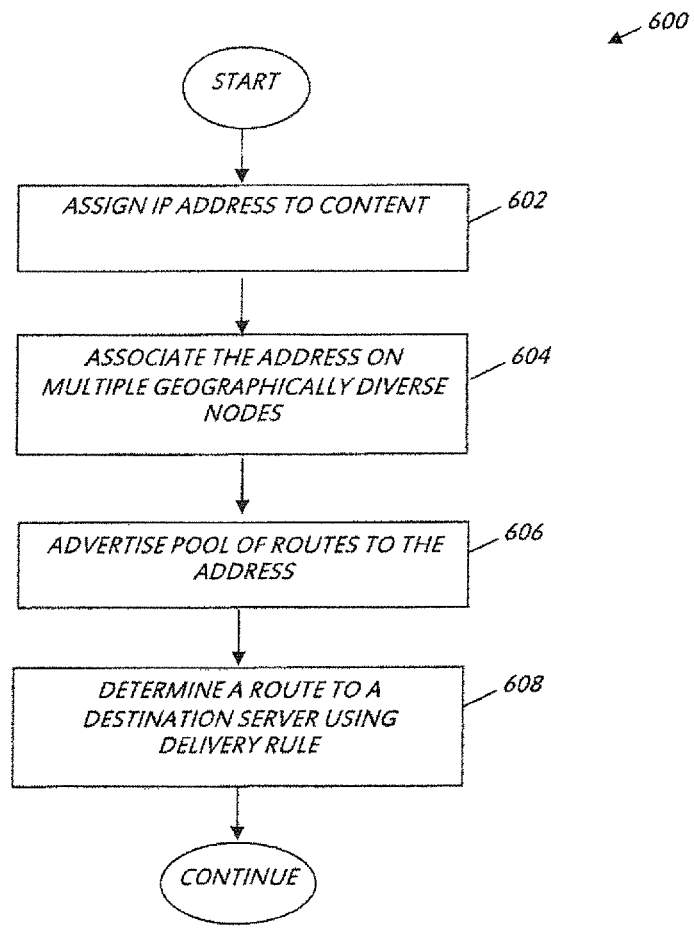
FIG. 6 is a logical flow diagram illustrating an exemplary method for content retrieval by a client of anycast CDN in accordance with one or more implementations.
Figure 7:
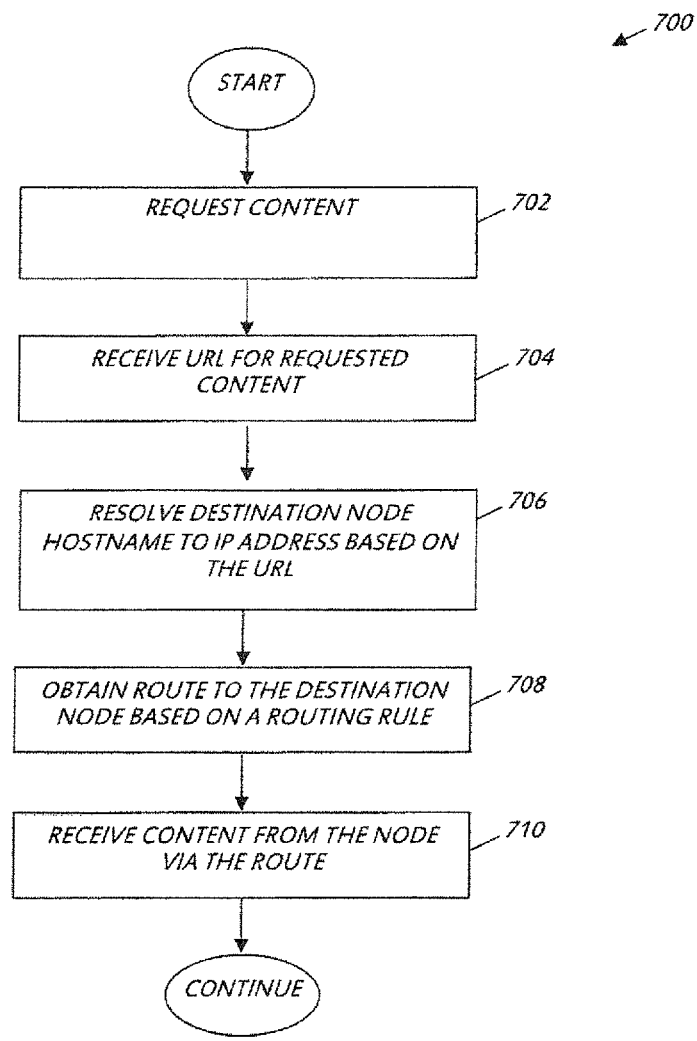
FIG. 7 is a logical flow diagram illustrating an exemplary method for node maintenance in anycast CDN in accordance with one or more implementations.
Figure 8:
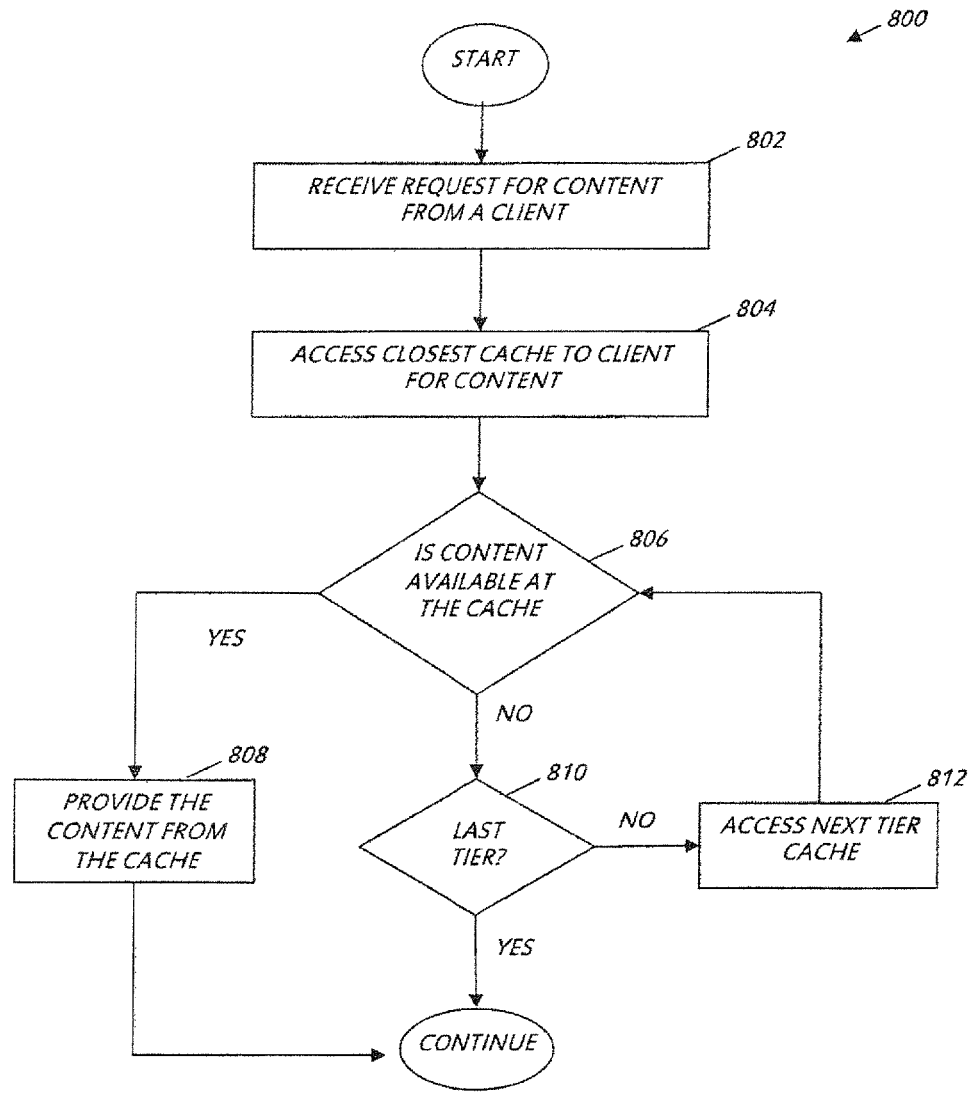
FIG. 8 is a logical flow diagram illustrating an exemplary method for content provision in anycast CDN comprising hierarchical cache in accordance with one or more implementations.

FIGS. 6-8 illustrate methods of content provision using anycast CDN methodology of the disclosure in accordance with one or more exemplary implementations. The operations of methods 600, 700, 800 presented below are merely intended to be illustrative of the broader principles. In some implementations, methods 600, 700, 800 may be accomplished with one or more additional operations not described, and/or without one or more of the operations discussed. Additionally, the order in which the steps of methods 600, 700, 800 are illustrated in FIGS. 6-8 described below is not intended to be limiting.

The methods 600, 700, 800 may be implemented for example using computerized apparatus and logic; e.g., in one or more processing devices (e.g., a digital processor, an analog processor, a digital circuit designed to process information, an analog circuit designed to process information, a state machine, and/or other mechanisms for electronically processing information and/or execute computer program modules). The one or more processing devices may include one or more devices executing some or all of the operations of methods 600, 700, 800 in response to instructions stored electronically on an electronic storage medium. The one or more processing devices may include one or more devices configured through hardware, firmware, and/or software to be specifically designed for execution of one or more of the operations of methods 600, 700, 800.

Referring to FIG. 6, an exemplary embodiment of a method 600 for content delivery in a packetized network using anycast CDN is illustrated. At step 602 of method 600, one or more addressees may be assigned to content and/or service. In some implementations, the address 10.2.2.1 may be assigned to, e.g., a discovery channel, an interactive application (e.g., multiuser video game), and/or an audio-visual communications application (e.g., Skype®).

At step 604 of the method 600, the one or more IP addresses are associated with multiple nodes of the packetized network. In some implementations, individual nodes may comprise delivery cache 214 in FIG. 2 and/or a hierarchical cache (e.g., 414 in FIG. 4). Individual nodes may be disposed locally, and/or in geographically diverse locations (e.g., different buildings, cities, counties, and/or other locations) in accordance with a demand map associated with network clients.

At step 606, a pool of routes to the IP address for the content are advertised. In some implementations, the address advertising is performed in accordance with the anycast methodology, and comprises placing the advertised routes into the routing tables associated with individual nodes and/or locations.

At step 608, a route to a destination server is determined using e.g., a delivery rule. In some implementations, the rule may comprise a 'shortest path' routing rule, and the destination node may be the geographically closest node. As will be appreciated by those of ordinary skill given this disclosure, various other rules may be utilized with the methodology described herein, such as, for example, lowest delay route, route based on availability, guaranteed bandwidth, and/or other rules.

FIG. 7 illustrates an exemplary embodiment of a method for content retrieval by a client of anycast CDN in accordance with the disclosure.

At step 702 of the method 700, the client submits a request. The request may comprise for instance a request for content (e.g., VOD), an application, and/or a service (e.g., visual communications).

At step 704, the client receives a hostname (e.g., a URL) associated with the requested content (e.g., timewarnervideo.new.com).

At step 706, the destination hostname is resolved to determine an IP address associated with the content. In some implementations, the client performs a DNS lookup to resolve the host name. The client may be for instance provided with a list of servers for login and authentication into the network. Based on a DNS request by the client, the DNS server can respond with a list of available IP addresses, e.g., 10.0.0.19, 10.0.0.20, 10.0.0.1, 10.0.0.2.

At step 708, the client obtains a route to the destination node in accordance with a routing rule. In some implementations, the node comprises a delivery cache (e.g., cache 214 in FIG. 2) and/or a hierarchical cache (e.g., 414 in FIG. 4). The client is in one embodiment configured to select one address using one or more selection methodologies, such as e.g., random selection, incrementing/decrementing selection, and/or other mechanism. The DNS server provides an IP address (e.g., 10.2.2.1) from a bank of available IP addresses using, e.g., round-robin selection methodology. The approaches described above advantageously enable spreading of load associated with content delivery among N IP addresses in the pool. In one embodiment, the routing rule is configured based on one or more of: (i) geographical proximity of the client to the node, (ii) lowest delay route, (iii) route based on availability, (iv) guaranteed bandwidth, (v) content encoding level (e.g., MPEG2, MPEG4), (vi) client device type (e.g., a smartphone, a television), (vii) client connection bandwidth (e.g., LTE, Wi-Fi), and/or (viii) client subscription level.

At step 710, the content may be received by the client from the node via the route. In some implementations, content provision is a single hop delivery from a delivery cache (e.g., 212 in FIG. 2), and/or a multi-hop delivery from a higher tier cache (e.g., 414 in FIG. 4) of the network cache hierarchy, e.g., as described in detail with respect to FIG. 8, below.

FIG. 8 illustrates an exemplary embodiment of a method for content provision in anycast CDN comprising hierarchical cache in accordance with the disclosure.

At step 802 of the method 800, a request is received by the network. The request comprises for example a request for an advertised content (e.g., VOD), an application, and/or a service (e.g., visual communications). The content is associated with a pool of advertised addresses (e.g., 10.0.0.0-10.0.0.29).

At step 804, the request is routed to a delivery cache using, for example the closest route rule.

At step 806 a determination is made as to whether the requested content is available at the cache. Responsive to a determination that the content is available, the method proceeds to step 808, wherein the content is provided to the client. Content provision of operation 808 comprises a single hop delivery from a delivery cache (e.g., 212 in FIG. 2) and/or a multi-hop delivery from a higher tier cache (e.g., 414 in FIG. 4 having the IP address pool 10.0.0.8-10.0.0.29 associated therewith) of the network cache hierarchy.

Responsive to a determination at step 806 that the requested content is not available, the method proceeds to step 810. At step 810, a determination is made as to whether additional tiers of the cache hierarchy may be accessed. In one example, the delivery cache is configured with a list of IP addresses for higher-tier caches that are able to fulfill the backfill request. In one or more implementations, the cache tier availability is based on a response from a higher level node within the cache hierarchy (e.g., 10.0.0.28).

Responsive to a determination at step 810 that another level of cache may be accessed, the method proceeds to step 812. At step 812, the request may be routed to the next tier cache (e.g., tier 1 cache 414 of FIG. 4). Subsequently, the method may proceed to step 806.

Exemplary Node Apparatus

The exemplary embodiments of the anycast CDN described herein may be implemented using general purpose software and/or hardware resources. For example, the software may comprise a Linux operating system (OS) based delivery cache application running a routing daemon (e.g., a Quagga routing suite), a caching daemon, and/or a route manager. The route manager may be configured to advertise and/or withdraw delivery routes based on one or more metrics described herein.

Figure 9:
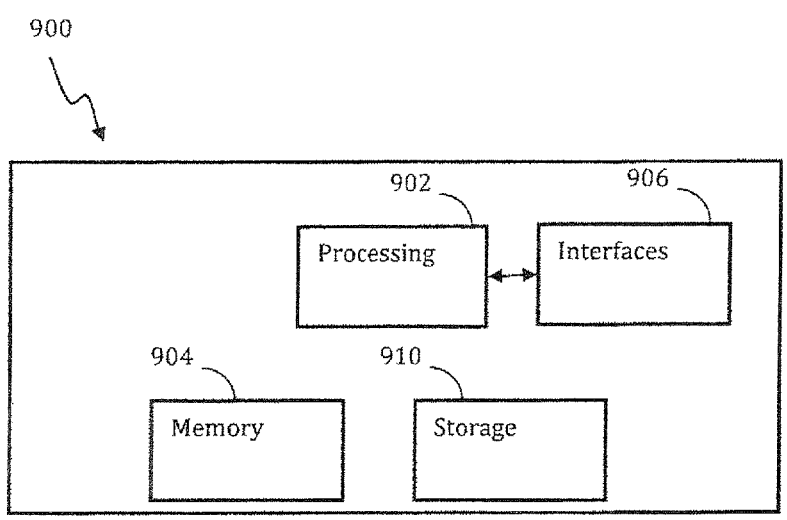
FIG. 9 is a functional block diagram depicting an exemplary node apparatus of packetized network useful for providing content using anycast methodology in accordance with one or more implementations.

Hardware resources can include for example general-purpose computing hardware. FIG. 9 depicts an exemplary embodiment of a node apparatus of a packetized network useful for providing content using the anycast methodology described herein. The node 900 includes processing logic 902 (e.g., a processor) configured to execute one or more software modules, a memory 904 to support application execution, storage 910, and one or more interfaces 906. The interfaces 906 include one or more network interfaces for communication to an origin server 430, cache tiers 416 in FIG. 4, clients 402, and/or other network entities. The memory 904 may be utilized for storing application data and/or caching content. The storage can be utilized for storing content, routing tables, operation system data (e.g., OS image), and/or other data. The memory 904 in one variant is characterized by lower access time, compared to the storage 910, the latter which comprises a nonvolatile medium (e.g., magnetic, optical, and/or charge based (e.g., flash), while the memory 904 may comprise a volatile medium (e.g., DRAM, SRAM, and/or other).

In one or more implementations, the node 900 is configured using commercial off-the-shelf computing platform (e.g., Dell PowerEdge server, and/or another apparatus), which advantageously obviates the need for custom or specialized hardware. Hardware and/or software configurations of individual nodes (e.g., 412, 414, 416) may be set in accordance with requirements of a target application (e.g., content traffic). By way of a non-limiting illustration, a VOD traffic node may be configured to comprise larger storage 910 compared to a node configured to serve linear content. The latter node may include more of faster access memory 904, as compared to the VOD node. In some implementations, the network has a heterogeneous configuration, wherein the hardware configuration of individual nodes is tailored in accordance with specific cost and/or performance requirements. Software "agnostic" implementations of the CDN described herein advantageously enable optimization of software modules (e.g., web server) for the traffic being served. By way of example, an Apache server may be selected to handle linear content, and a NGiNX server may be selected for providing VOD content.

In some implementations, a given hardware node configuration configured, e.g., to support linear content delivery, is augmented to support VOD by use of additional storage (e.g., hard disks). The additional storage can be embodied within the node serve, and/or as an attached array (e.g., via a serial bus and/or as network attached storage).

Exemplary Operation

In the exemplary configuration illustrated in FIG. 2, content delivery may be configured as follows. To receive content, a client device (e.g., device 202) may submit a request to a CST (or content location mapping layer). The request may be for instance a request for a particular content (e.g., watch a TV show) and/or a service , (e.g., a video services (e.g., network DVR, second screen apps, cloud based digital navigators, OnDemand or over-the-top (OTT) content (e.g., Netflix®, Hulu®, virtual MSO services, and/or other)), visual communications (e.g., Skype®, Facetime®, and/or other), or cloud computing/storage/streaming and/or other services. The CST may provide the client with a universal resource locator (URL) (e.g. timewarner.video-.com) of a server that may be providing the content and/or service requested. The client resolves the hostname in that URL to a destination IP address (e.g., 10.2.2.1). The client performs a DNS lookup to complete this step. In some implementations, based on a DNS request by the client, the DNS server responds with a list of available IP addresses, e.g., 10.0.0.19, 10.0.0.20, 10.0.0.1, 10.0.0.2. The client selects one address using one or more selection methodologies such as via a random selection or selection of addresses not previously selected. The DNS server provides an IP address (e.g., 10.2.2.1) from a bank of available IP addresses using, e.g., round robin selection methodology. As previously described, the foregoing approach enables spreading of load associated with content delivery among N IP addresses in the pool.

The client 206 submits requests for content and/or service to the resolved address (10.2.2.1). Based on the anycast methodologies described above, a server associated with the selected route (e.g., the route 226 to the closes server 216) serves the requested content. It will be appreciated by those skilled in the art that although DNS address resolution is described above, other IP distribution/resolution methodologies may be utilized, such as, offering of IP addresses during the content mapping step, rather than a URL. IP distribution/resolution methodologies may for example utilize an arbitration layer, which would receive the resolution request (be it DNS or otherwise), and either locally select an edge server, or proxy the request to another selecting agent (Velocix DNS, for example).

The anycast CDN framework may be utilized with the transmission control protocol (TCP). In some implementations, a TCP session is expected not to exceed a given duration (e.g., 0.5 second to 1 second). By way of a non-limiting illustration, when the duration of the TCP session is configured less than 1 s, probability of changes to network configuration (e.g., route withdrawals and/or changes) is reduced, compared to a longer session duration (e.g., 10 s). Even when a network change occurs within an active TCP session, the impact of the change may be smaller (compared to a longer session duration), as shorter TCP sessions may deliver less data (and may in some instances need to have the data re-requested). Responsive to change detection during an active TCP session, a new session may be established in accordance with the changed network configuration and the requested portion content may be re-delivered.

The anycast CDN may also be configured to be operable absent a centralized control layer. Nodes (e.g., delivery cache 412 in FIG. 4) of the exemplary embodiment of the anycast CDN framework employ address resolution. In some implementations, the address resolution system (e.g., DNS) is decoupled from the traffic engineering within the network. In order to ensure uninterrupted delivery of content and/or reduce probability of IP stranding, the CDN may include a resolution layer (RL). The RL is in one variant configured to receive information related to one or more routes being advertised (e.g., 422 in FIG. 4). The resolution layer receives a BGP feed in order to monitor route additions and/or withdrawals. The RL updates the pool of resolvable routes based on the route addition and/or withdrawal information. In some implementations, the RL is configured to reduce route identification delays, and/or incorporate route time to live (TTL) information into route pool updates.

In some variants, a pool of advertised route addresses is distributed between multiple delivery caches based on a static route-pair advertising mechanism, e.g., as described in detail with respect to Table 1, below.

Table 1 illustrates the static assignment of a pool of twenty (20) routes comprising addresses 10.0.0.1 through 10.0.0.20 among 10 delivery caches. The delivery cache 1 is in this example configured to provide routes 10.0.0.19, 10.0.0.20, 10.0.0.1, 10.0.0.2; the delivery cache 2 is configured to provide routes 10.0.0.1; 10.0.0.2, 10.0.0.3, 10.0.0.4.

As may be seen from data presented in Table 1, a given delivery cache can advertise 20% (e.g., ⅕th) of network routes. In order to ensure that a given route remains available during network operation, any given delivery address may be advertised by two individual caches (e.g., the address 10.0.0.1 is advertised by the caches 1, 2 in Table 1).

Responsive to one of the caches (e.g., 1) becoming unavailable (e.g., due to a failure and/or a scheduled maintenance event), the remaining cache (e.g., 2) remains available to serve the route 10.0.0.1. The rolling advertisement shown in Table 1 advantageously enables uninterrupted content provision when a given delivery cache becomes unavailable.

TABLE 1

Example Static Route Advertisement Table

| Delivery Cache | Static Route Advertisements |
|---|---|
| 1 | 10.0.0.19, 10.0.0.20, 10.0.0.1, 10.0.0.2 |
| 2 | 10.0.0.1, 10.0.0.2, 10.0.0.3, 10.0.0.4 |
| 3 | 10.0.0.3, 10.0.0.4, 10.0.0.5, 10.0.0.6 |
| 4 | 10.0.0.5, 10.0.0.6, 10.0.0.7, 10.0.0.8 |
| 5 | 10.0.0.7, 10.0.0.8, 10.0.0.9, 10.0.0.10 |
| 6 | 10.0.0.9, 10.0.0.10, 10.0.0.11, 10.0.0.12 |
| 7 | 10.0.0.11, 10.0.0.12, 10.0.0.13, 10.0.0.14 |
| 8 | 10.0.0.13, 10.0.0.14, 10.0.0.15, 10.0.0.16 |
| 9 | 10.0.0.15, 10.0.0.16, 10.0.0.17, 10.0.0.18 |
| 10 | 10.0.0.17, 10.0.0.18, 10.0.0.19, 10.0.0.20 |

The delivery caches are in one embodiment configured in accordance with an internal BGP (iBGP) full-mesh approach. In the iBGP full-mesh implementations, individual router (e.g., 336 in FIG. 3) is configured to advertise all locally originated routes (e.g., 10.0.0.1-10.0.0.2 in FIG. 3). Such advertisement configuration enables a given network delivery cache to access routes advertised by other network caches. Based on the advertised route information, a given cache (e.g., 312 in FIG. 3) implements "intelligent" route management, wherein a given route (e.g., 10.0.0.1) may be withdrawn from the advertised pool by the cache 312 based on the route availability from another cache (e.g., 316 in FIG. 3). The route advertising and/or withdrawal configuration described above is employed to, inter alia, prevent the stranding of an address.

The delivery caches may be configured (e.g., using the advertised route information described above) to monitor for the stranding of addresses. Responsive to a detection of a stranded route (e.g., 10.0.0.3), one or more caches (e.g., 312, 314, 316) add the stranded route address to the advertised pool. Subsequently, individual caches (e.g., 316) withdraw the route 10.0.0.3 from the advertised pool based on the advertised route information that the route is advertised by two or more other caches (e.g., 312, 314 in FIG. 3). As can be appreciated, the IP route management methodology described herein advantageously provides proactive address stranding prevention in a dynamic fashion, without use of an "artificial floor" that may be associated with the static route advertisement option and/or enable dynamic response by the network to inadvertent address stranding.

Route management in the exemplary anycast CDN is configured based on a hybrid of the statically advertised routes and iBGP mesh awareness. In one variant of the hybrid route management, the delivery caches utilize the advertised route information (e.g., in the manner described above) in order to monitor route stranding; a fallback network entity advertises of all of the anycast routes (10.0.0.1-10.0.0.2 in FIG. 3) with an increased route metric. In one or more implementations, the fallback entity is embodied as a centralized server and/or multiple distributed servers. The metric may be configured for example based on one or more of: (i) prefix length, wherein longer subnet masks may be preferred; (ii) a cost metric, wherein a lower cost may be preferred; and/or (iii) an administrative distance, wherein a lower distance may be preferred, and/or other. In order to reduce the fallback entity load, the hybrid route management approach prevents traffic routing by the fallback entity unless none of the primary delivery caches advertising the route remain available.

The anycast CDN methodology described herein advantageously enables content provision via multiple routes, spreading of content requests between multiple delivery caches, automatic and manual traffic engineering, and hierarchical pool selection. As previously noted, an anycast CDN can be implemented without a centralized control layer, and employ generic hardware and/or software platforms. Accordingly, the network may be scale (vertically and/or horizontally) by adding cache delivery nodes and/or cache hierarchy levels. In some implementations, one or more cache levels may be disposed off of the network. Popularity indexing and/or cache scoping may also be implemented within the anycast CDN.

Cache selection for the CDN cache configuration described herein can also be decoupled from address resolution. This advantageously alleviates a need for central control plane, simplify network layout and/or implementation, and enable a client to obtain the IP address of the edge cache through any applicable mechanism (e.g., using DNS and/or as a part of the sign on process, and/or other.)

A CDN configured in accordance with the present disclosure also advantageously enable timely "bleeding" (i.e., reduction of traffic) of excess traffic by, e.g., adjusting one or more maintenance metrics. The metrics may comprise for example one or more of (i) remaining capacity, (ii) path length, and/or (iii) local preference. The traffic management responsiveness of the CDN described herein may be based, at least partly, on reduction and/or elimination of delays that may be associated with DNS resolutions and/or client caching expiration operations in networks configured in accordance with the prior art.

In some embodiments, the CDN is configured to characterize served content by one or more categorization parameters (e.g., "linear", "VOD", "popular linear", "pre-seeded VOD", "ESPN linear"). A limited-access CDN may be implemented based on e.g., content (e.g., "adult content"), and may include a range of addresses not accessible by users of a 'regular-access' network. Content-based network configurations can advantageously be implemented in a timely manner without delays that may be associated with, e.g., flag-day migration of the prior art networks (more statically defined networks).

The exemplary embodiment of the CDN described herein effectuates traffic management by, e.g., automatically rerouting traffic around failed nodes, and dynamically and/or automatically managing node traffic to prevent node overutilization, and/or to support maintenance activities. During traffic failover to a next closest delivery cache, traditional capacity planning rules (e.g., deterministic failover paths) may be utilized. Additional methods of traffic control can be implemented in the anycast CDN of the disclosure based on, e.g., traffic metrics. By way of illustration, dynamic node rerouting between multiple nodes serving content for a given IP address can be employed in order to route around a failing/overloaded node.

The advertisement of pools of IP addresses enables support for hierarchical caching with a large number of levels (within hardware constraints of a given network implementation), the ability to "skip" levels, and/or support for simultaneous hierarchical and edge caching. The provision of real-time alarm functionality and/or event logging can be implemented through, for example, simple network management protocol (SNMP) traps and syslog messaging.

Authorization functions can be implemented to protect the CDN and origin servers. In some implementations, the authorization is configured based on user identity (e.g., user name, password), CPE device identity (e.g., MAC address), serving area (e.g., based on user location), user subscription level, and/or other mechanisms. Content security can be implemented by using e.g., secure transport protocols (e.g., HTTPS), and/or content encryption using any applicable methodologies known to those of ordinary skill.

The exemplary anycast CDN may also be configured to seamlessly support on-net and/or off-net traffic without requiring reconfiguration. For instance, on-net and off-net (and in fact, any group of addresses) may be serviced by any cache simply by advertising reachability to those addresses via BGP. This may take minimal software reconfiguration, but no hardware reconfiguration. Additionally, the CDN may provide support for delivery device layer packaging. In other words, since the CDN described is comprised of open-source software and COTS hardware, it is possible to build additional features onto the delivery cache such as just in time packaging. Still further, the CDN may allow per-service function and per-path flushing. The CDN could easily support the clearing of content based on a functional pool (i.e., "linear") or a specific service (i.e., "CNN") to remove stale data.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the techniques and architectures disclosed herein. This description is in no way meant to be limiting, but rather should be taken as illustrative of the general principles of the disclosure. The scope of the disclosure should be determined with reference to the claims.

What is claimed is:

1. A content delivery network, comprising:
a delivery cache in operable communication with a client device, the delivery cache configured to effectuate provision of content to the client device;
a first tier cache in operable communication with the delivery cache, the first tier cache configured to effectuate provision of the content to the delivery cache; and
a pool of active routes associated with at least one network address;
wherein:
the delivery cache is accessible by the client via any one of a range of Internet Protocol (IP) addresses;
the delivery cache is further configured to, upon detection of a failed route, effectuate withdrawal of the failed route from the pool of active routes based at least on a determination of the existence of an active route to prevent stranding of the at least one network address; and
the first tier cache is accessible by the delivery cache via any one of at least one subset range of the range of IP addresses.

2. The network of claim 1, wherein:
the delivery cache is further configured to, based on the content being available at the delivery cache, provide the content to the client in response to receipt of a client request; and
the content provision to the client is characterized by an absence of a backfill of the content from the tier one cache to the delivery cache, subsequent to the request.

3. The network of claim 1, wherein
the delivery cache is configured to, based on the content being not available at the delivery cache, provide the content to the client pursuant to a client request and to a content backfill operation conducted between the first tier cache and the delivery cache, the backfill operation conducted subsequent to and substantially in response to the request.

4. The network of claim 1, further comprising:
another tier cache operative at a tier different than that associated with the first tier cache, the another tier cache in operable communication with the delivery cache, the another tier cache configured to effectuate provision of the content to the delivery cache;
wherein the delivery cache is configured to, based on the content being not available at the delivery cache, provide the content to the client pursuant to a client request and a content backfill operation between one of the first tier one cache or the another tier cache and the delivery cache performed subsequent to the request.

5. The network of claim 4, wherein:
the first tier cache and another tier cache are configured to form a hierarchy characterized by at least two levels;
each of the IP addresses comprises 32 bits; and
the delivery cache is configured to perform the content backfill operation from the another tier cache without the another tier cache uploading the content into the first tier cache.

6. A non-transitory computer-readable apparatus configured to store one or more computer programs thereon, the one or more computer programs comprising a plurality of instructions configured to, when executed:
based on a request to withdraw an active route from a pool of active routes of a network, determine a network address associated with the route;
determine existence of another active route of the pool of active routes; and
effectuate withdrawal of the active route from the pool of active routes based at least on the determination of the existence of the another active route to prevent stranding of the network address;
wherein:
the active route and the another active route are configured to provide content associated with the network address to a client of the network; and
the determination of existence of the another active route is based at least on a match between the network address and an address of the another route within the network.

7. The apparatus of claim 6, wherein:
the active route is associated with a first node of the network providing the content to the client prior to the request; and
the withdrawal of the active route is characterized by a termination of the content provision by the first node to the client via the active route.

8. The apparatus of claim 7, wherein the another active route is associated with a second node of the network, the first and the second nodes being addressable by the client via the address of the network.

9. The apparatus of claim 6, wherein the one or more programs are further configured to, based on a determination that no other active route associated with the address exists, retain the active route within the pool of active routes, the retaining of the active route characterized by continuing provision of the content to the client.

10. The apparatus of claim 6, wherein the content comprises a sequence of data packets associated with: (i) provision of video on demand content; (ii) provision of broadcast content; (iii) an operation of a visual communications service; and/or (iv) interactive application characterized by one or more client inputs.

11. The apparatus of claim 6, wherein the pool of active routes is configured to be advertised.

12. The apparatus of claim 6, wherein the plurality of instructions are further configured to, when executed and based at least on a selection of a given route of the pool of active routes, cause delivery of the content to the client via a node of a plurality of nodes associated with the pool of active routes, the given route comprising the node.

13. The apparatus of claim 12, wherein the selection of the given route is conducted in accordance with a routing rule based at least on one of: (i) node load, (ii) route available bandwidth, and (iii) service level associated with the client.

14. The apparatus of claim 13, wherein:
the routing rule is further based on a proximity measure between the client and the node, the node characterized by a first distance to the client that is shorter than a second distance between the client and another one of the two or more nodes.

15. The apparatus of claim 6, wherein:
the association of the content with the address is based at least on a distribution of a list of valid addresses provided to the client after authentication of the client to the network.

16. The apparatus of claim 6, wherein the association of the content with the address is based at least on a domain name system protocol.

17. The apparatus of claim 6, wherein at least a portion of the network comprises a packet network configured to deliver the content over an Internet Protocol television (IPTV) service.

18. The apparatus of claim 17, wherein the content comprises linear content.

19. The apparatus of claim 6, wherein the plurality of instructions are further configured to, when executed, cause provision via a delivery cache of the content to the client, the causation of provision substantially in response to a client request and based at least in part on the content being available at a delivery cache;
wherein the content provision to the client comprises at least one content backfill operation performed between a first tier cache and the delivery cache.

20. A method of operating a packet-enabled content distribution network so as to prevent stranding of a network address, the method comprising:
based at least on a request to withdraw an active route from a pool of active routes of the network, determining a network address associated with the active route;
determining an existence of at least one other active route of the pool of active routes, the at least one other active route also comprising the network address and capable of providing content associated with the network address to a client device of the network; and
effectuating withdrawal of the active route from the pool of active routes based at least on the determination of the existence of the at least one other active route.

21. The method of claim 20, wherein the at least one other active route is associated with a node of the network, the node being addressable by the client device via the network address.

22. The method of claim 20, further comprising retaining, based at least on a determination that no other active route associated with the address exists, the active route within the pool of active routes, the retaining of the active route enabling continued provision of the content to the client.

23. The method of claim 22, wherein the provision of the content comprises providing a sequence of data packets associated with real-time content, and the retaining of the active route prevents interruptions of delivery of the real-time content.

24. The method of claim 20, further comprising advertising the pool of active routes to one or more client devices of the network.

25. The method of claim 20, further comprising instituting use of the at least one other active route for delivery of the content prior to said effectuating, and wherein the method is performed substantially automatically in the event of detection of a failure of the active route.

26. The method of claim 20, wherein the at least one other active route comprises a plurality of other active routes, and the method further comprises selection of a given route in accordance with a routing rule based on one or more of: (i) service level associated with the client device, (ii) content encoding rate, and/or (iii) resolution of a display apparatus associated with the client.

27. The method of claim 20, wherein the at least one other active route comprises a plurality of other active routes, and the method further comprises selection of one of the plurality of other routes based at least on a proximity measure between the client device and a network node.

* * * * *